US008910499B2

(12) United States Patent
De Franceschi

(10) Patent No.: US 8,910,499 B2
(45) Date of Patent: Dec. 16, 2014

(54) MULTIFUNCTIONAL LOCKING DEVICE AND SERVOMOTOR WITH ACTUATOR WHICH CAN BE WOUND UP AROUND AN INTERCHANGEABLE REEL

(76) Inventor: Daniele De Franceschi, Sasso Marconi (IT)

( * ) Notice: Subject to any disclaimer, the term of this patent is extended or adjusted under 35 U.S.C. 154(b) by 1295 days.

(21) Appl. No.: 12/525,311

(22) PCT Filed: Jan. 31, 2008

(86) PCT No.: PCT/IT2008/000060
§ 371 (c)(1),
(2), (4) Date: Jul. 31, 2009

(87) PCT Pub. No.: WO2008/093382
PCT Pub. Date: Aug. 7, 2008

(65) Prior Publication Data
US 2010/0077810 A1    Apr. 1, 2010

(30) Foreign Application Priority Data

Feb. 1, 2007 (IT) .............................. BO2007A0066

(51) Int. Cl.
| | | |
|---|---|---|
| *E05B 47/08* | (2006.01) | |
| *E05F 11/00* | (2006.01) | |
| *F16H 1/00* | (2006.01) | |
| *G01G 17/00* | (2006.01) | |
| *G01G 23/37* | (2006.01) | |
| *G01G 15/00* | (2006.01) | |

(52) U.S. Cl.
CPC ............ *G01G 17/00* (2013.01); *G01G 23/3735* (2013.01); *G01G 23/3742* (2013.01); *G01G 15/00* (2013.01)
USPC ............. 70/280; 70/278.6; 70/278.7; 49/325; 242/899

(58) Field of Classification Search
USPC .......... 70/275, 277, 278.1, 278.6, 278.7, 280, 70/281, 282; 74/606 R, 501.5 R–507; 49/324, 325; 242/390.2, 394, 899
See application file for complete search history.

(56) References Cited

U.S. PATENT DOCUMENTS 4,018,397 A * 4/1977 Rusch et al. ................ 242/388.6
4,726,247 A * 2/1988 Hormann ..................... 74/424.6
(Continued)

FOREIGN PATENT DOCUMENTS

DE    195 34 614 A    3/1997
EP    0 534 413 A    3/1993
(Continued)

OTHER PUBLICATIONS

International Search Report, Jul. 10, 2008, from International Phase of the instant application.

*Primary Examiner* — Christopher Boswell
(74) *Attorney, Agent, or Firm* — Jackson Patent Law Office

(57) ABSTRACT

Disclosed are a multifunctional locking device a housing, and a motor in the housing. An actuator includes a distal end, a filament configured to convey a signal between the distal end and the housing, a first actuator section including a first plurality of engagement members, and a second actuator section including a second plurality of engagement members. There is a reel in the housing, the reel being driven by the motor, the reel being configured to wind up and store the first actuator section at a time when the first engagement members are disengaged from the second engagement members. A combining head is configured to bring the first actuator section together with the second actuator section, to engage the first engagement members with the second engagement members, thereby increasing a rigidity of the actuator, enabling the actuator to impart both a pushing force and a pulling force to an object.

35 Claims, 14 Drawing Sheets

(56) References Cited

U.S. PATENT DOCUMENTS

| | | | | |
|---|---|---|---|---|
| 4,819,495 A | * | 4/1989 | Hormann | 74/424.6 |
| 5,271,182 A | * | 12/1993 | Greisner et al. | 49/325 |
| 5,406,751 A | * | 4/1995 | Hansen et al. | 49/325 |
| 5,896,702 A | * | 4/1999 | Wæhrens et al. | 49/325 |
| 6,112,474 A | * | 9/2000 | Paine | 52/108 |
| 7,150,206 B2 | * | 12/2006 | Utaki | 74/502.6 |
| 7,387,046 B2 | * | 6/2008 | Ikeda et al. | 74/502.6 |
| 7,886,493 B2 | * | 2/2011 | Jorgensen et al. | 52/403.1 |
| 7,891,145 B1 | * | 2/2011 | Bobbio | 52/108 |
| 8,011,260 B2 | * | 9/2011 | Scott et al. | 74/89.2 |
| 2006/0219144 A1 | | 10/2006 | Phelan et al. | |

FOREIGN PATENT DOCUMENTS

| | | |
|---|---|---|
| EP | 1 484 465 A | 12/2004 |
| FR | 2 826 422 A | 12/2002 |
| FR | 2 839 351 A | 11/2003 |
| GB | 422 781 A | 1/1935 |
| WO | WO 96/19405 A | 6/1996 |

* cited by examiner

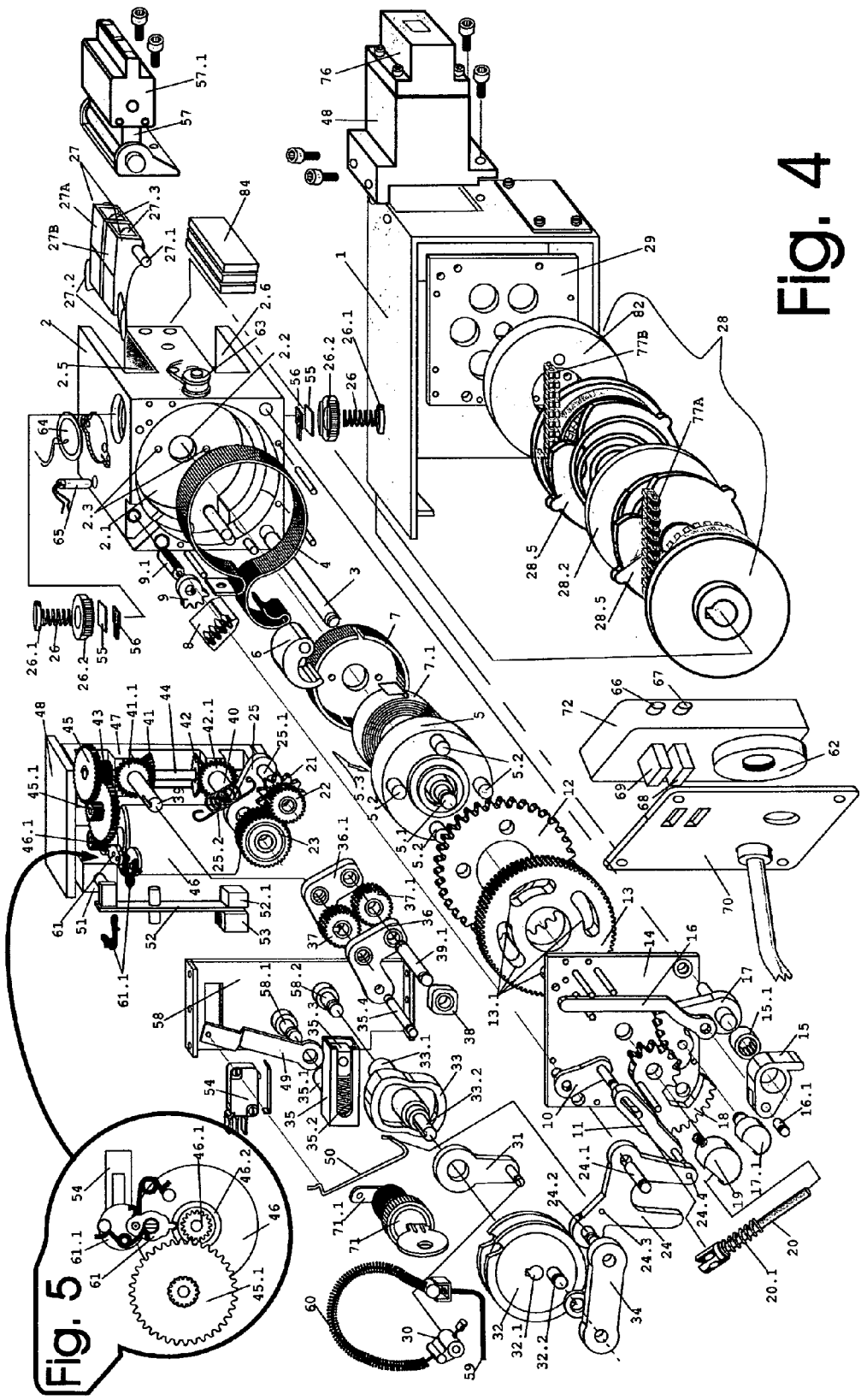

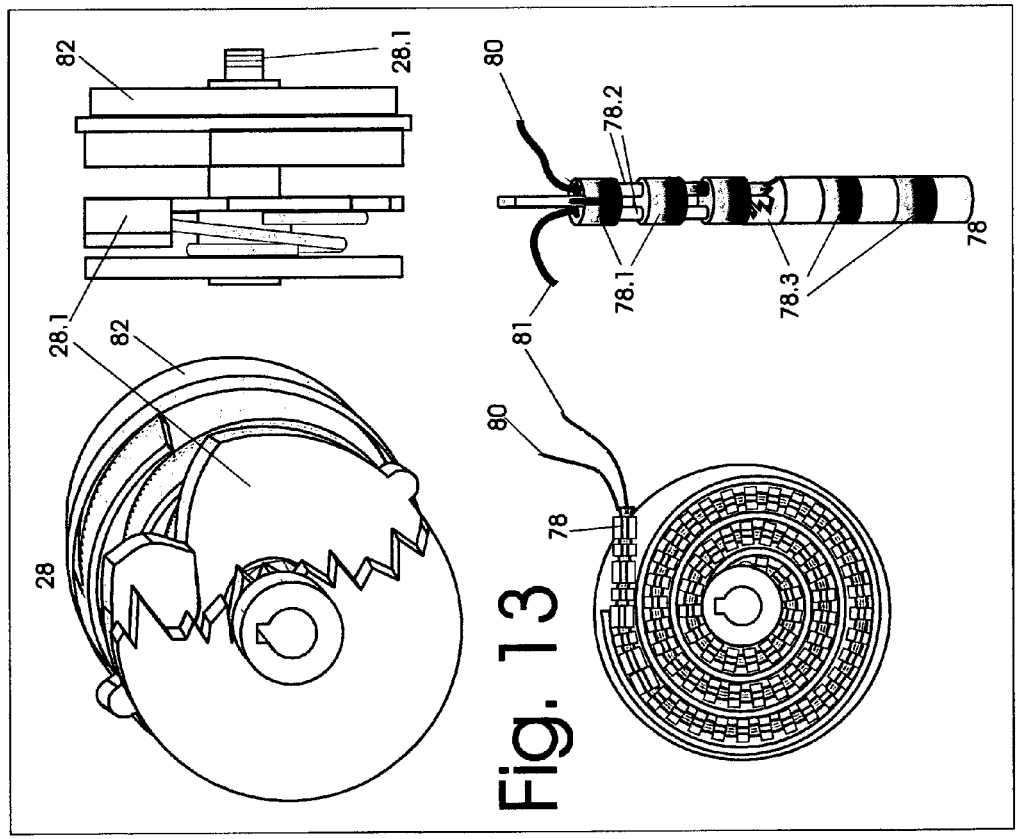
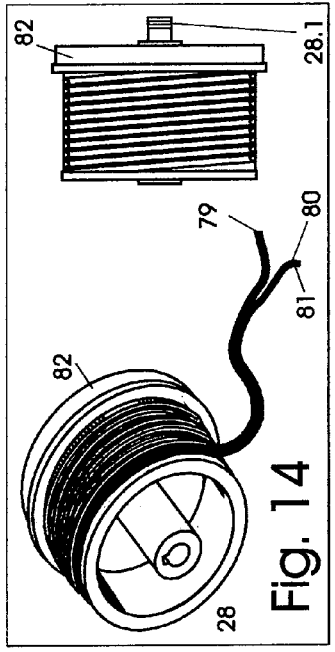
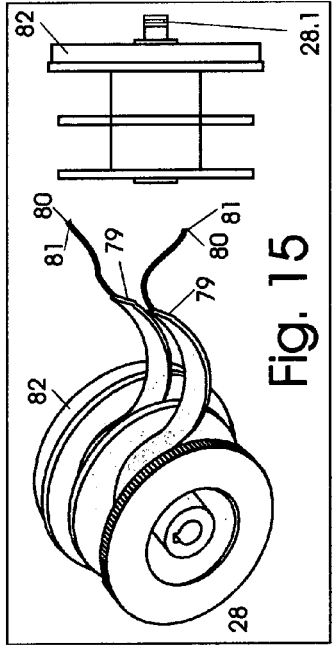
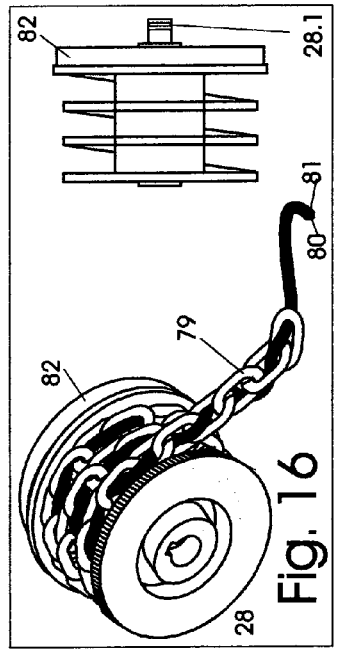

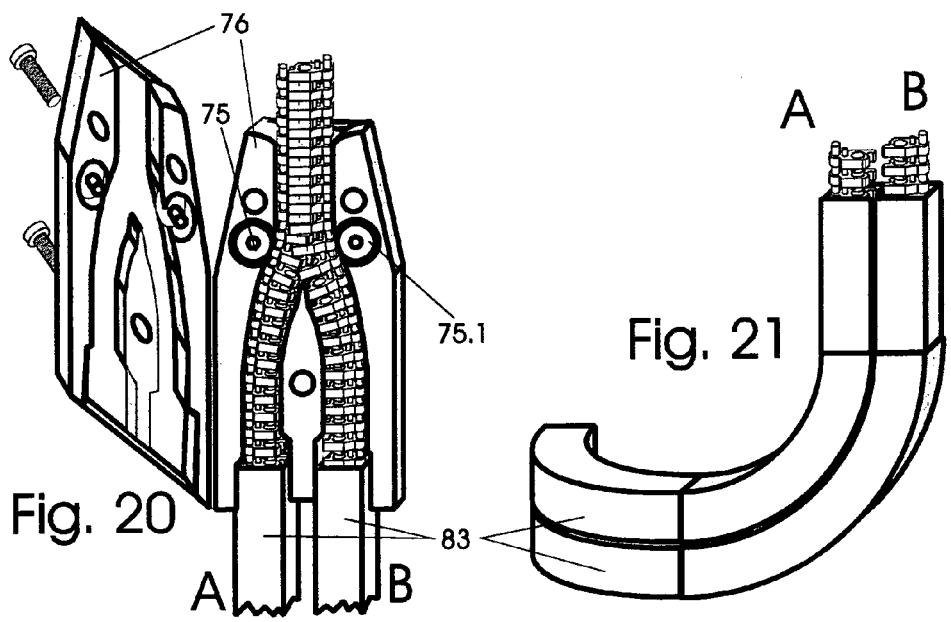
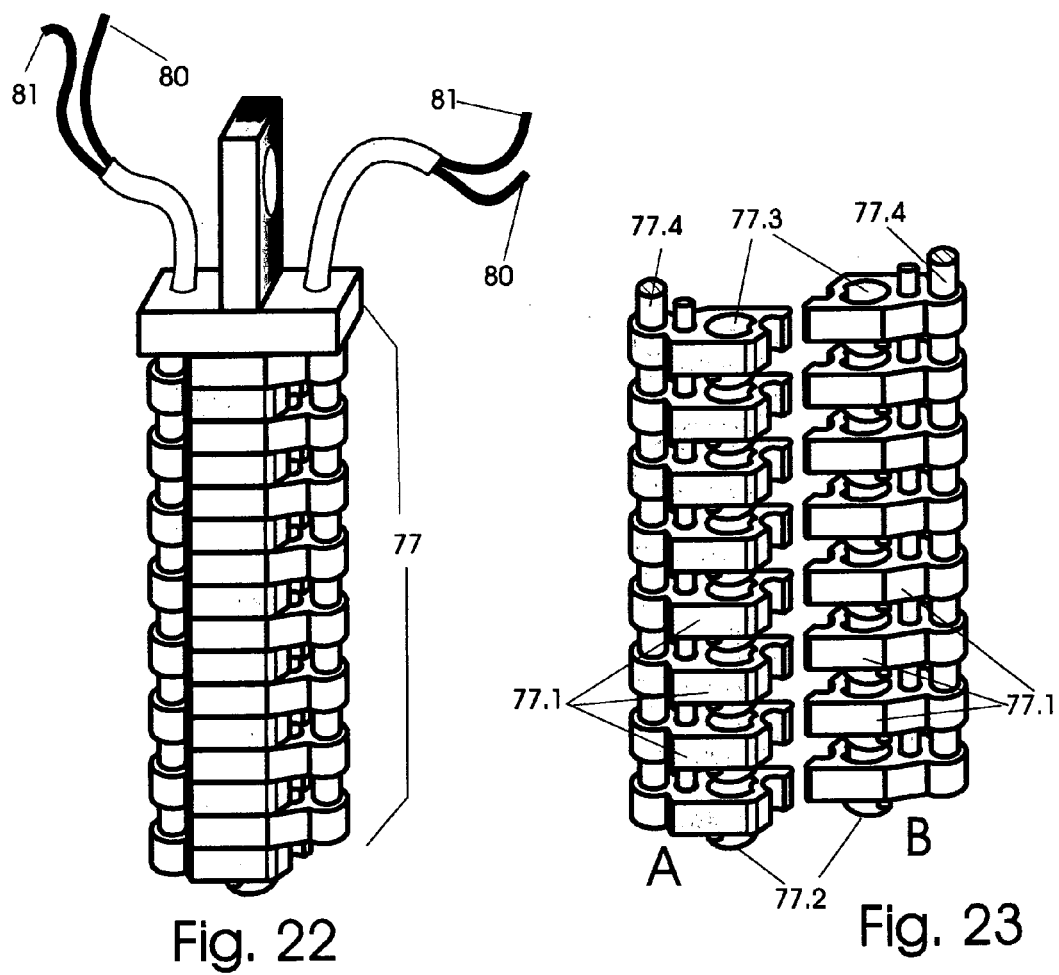
Fig. 20
Fig. 21
Fig. 22
Fig. 23

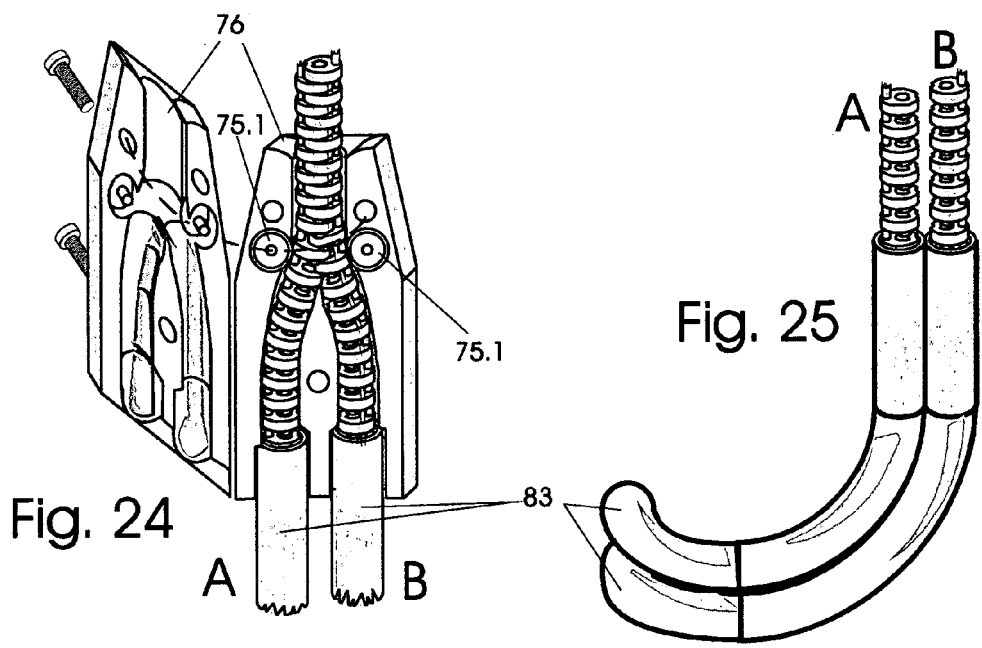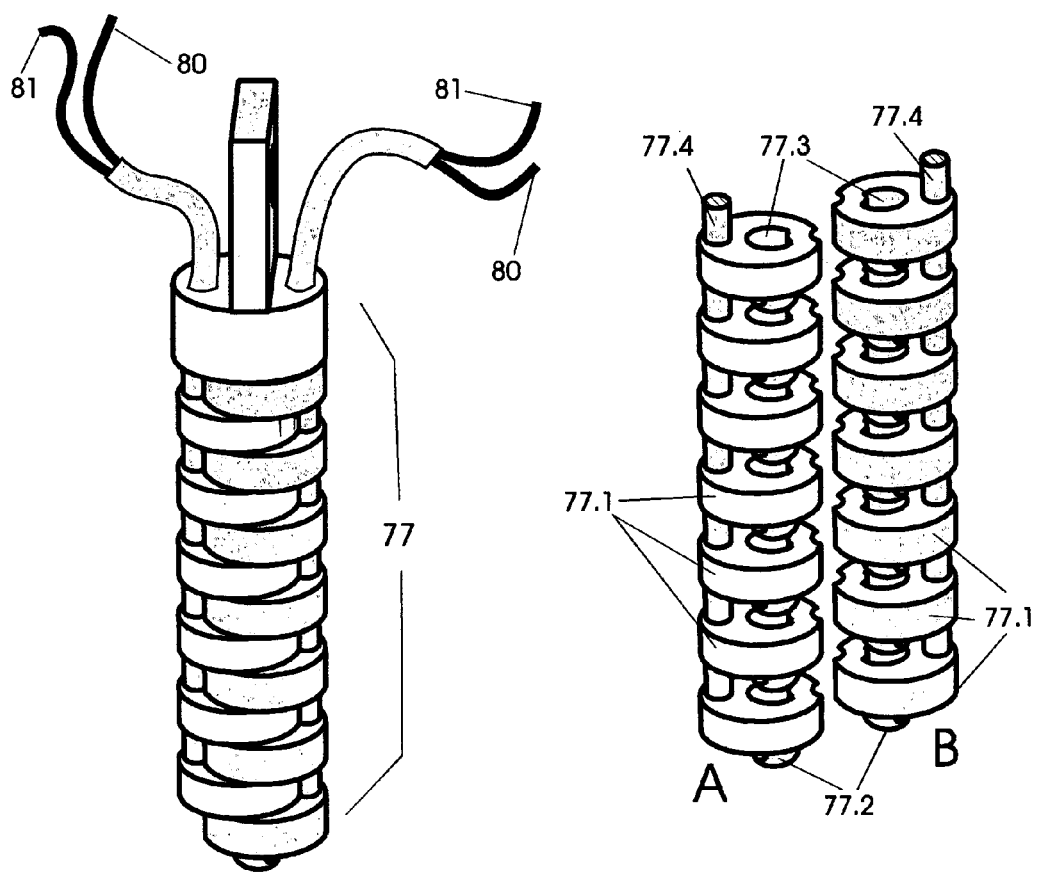

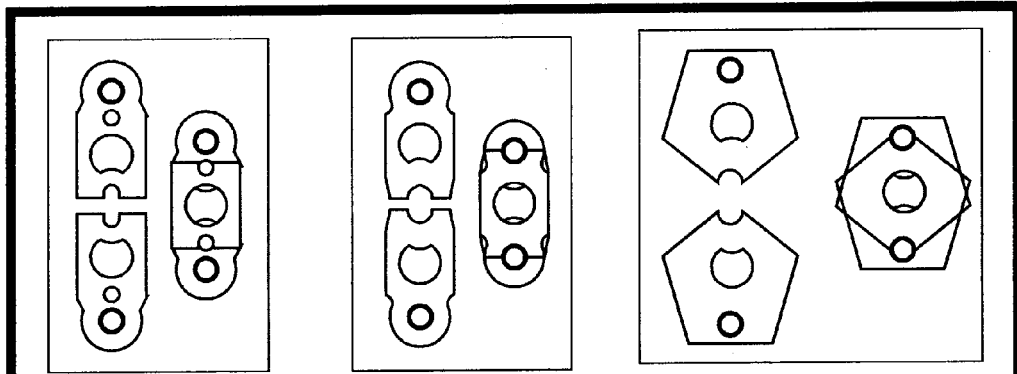
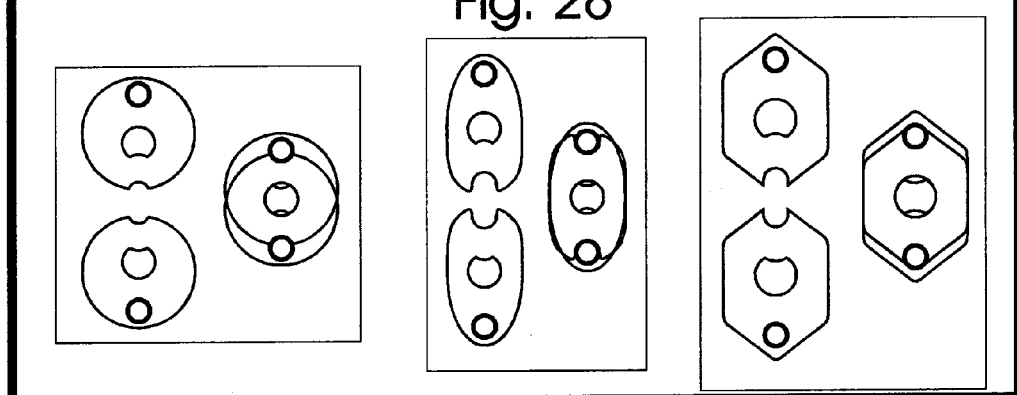
Fig. 28
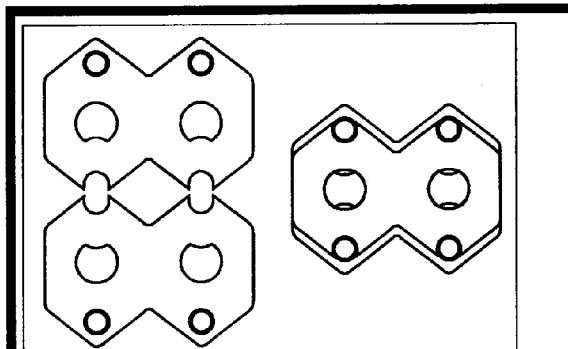
Fig. 29
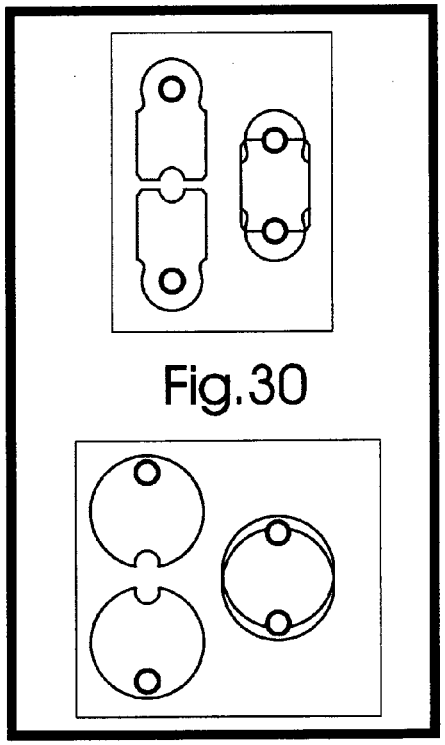
Fig. 30

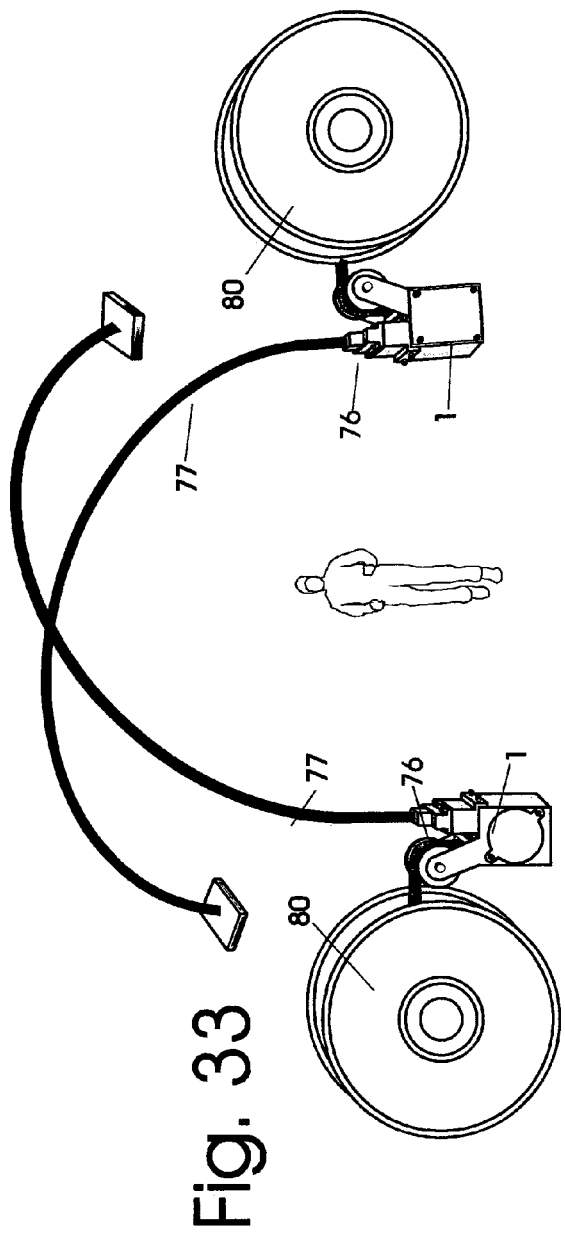
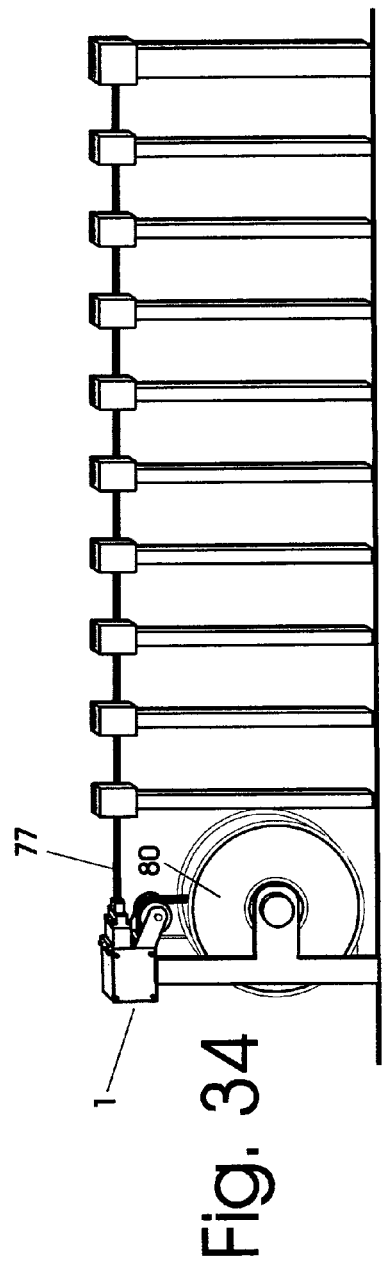
Fig. 33
Fig. 34

MULTIFUNCTIONAL LOCKING DEVICE AND SERVOMOTOR WITH ACTUATOR WHICH CAN BE WOUND UP AROUND AN INTERCHANGEABLE REEL

TECHNICAL FIELD

The invention described herein is a device carrying out different functions thanks to a servomotor, its main body, and to its actuator. When in rest position the device is comparable to a lock and anti-theft device with incorporated alarm system. Through its actuator, however, upon instructions it can become a source of motion, even at a distance, for any object connected to it. This device acts both as a protection and controlling system or as a holder of movables in a still position. Besides, it can act as a security control at a distance of any objects to which all the characteristics of the sensors fitted to the invention are conveyed once the object has become integral to it. In fact all signals are transmitted to the sensors through electric and/or optic fibre conductors inside the actuator. This device can then be applied to different fields: from home building to robotics, to parts of vehicles or aircrafts or articles of wide consumption.

BACKGROUND ART

In the present state of the art all locks are mostly fitted directly to the object which one intends to lock or in any case and necessarily near the bolt or the actuator, thus at the opening point. This is an inconvenience as it makes them easily detectable and easily reachable the breaking-into point. And even more so if one deals with locking devices using a mechanical key or with latch systems. Moreover, when necessary, in case of emergency exits or in case of failures or lack of electricity it is not always easy and quick to disconnect the engine-driven mechanisms thus to invalidate the opening or closing functions of the locking system with all related problems. Also, at present in case of a locking device disconnection the subsequent good re-establishment of the mechanism is often endangered. Besides, in the security and domotics fields an inconvenience is that it is necessary to fit different devices to obtain all the functions carried out by our device. For example, at present sensors and engine driver mechanisms must be fitted into or onto the inside or outside doors or shutters or opening points to perform the day and night functions. Moreover other protection, control and anti breaking-into systems are required and these are often aesthetically or practically not suitable and also rather expensive. Another inconvenience is that all the present systems in case of failure must either be repaired or replaced as they have lost their characteristics and, while waiting for an engineer to arrive, often not quickly, the disabling of the mechanism and thus closure of doors and windows as well as the protection of real estates also from breaking-into dangers is not always safe and easy or even possible. Other usually rather large and sometimes hardly available to the wide public devices are those using a hybrid system made up mostly by air or oil miniaturized pistons always connected to a compressor or to an hydraulic control unit which make them difficult to fit both for space reasons and above all for difficulty to fit all security controls and limit switches. A further inconvenience has been noticed also when different mechatronics devices using actuators made up of complex and redundant mechanisms have been used for example in some expanding fields such as amateur, professional and/or industrial robotics applied also to two or more wheel-vehicles and to mobile or hide away accessories. What is needed, therefore, is a device combining different functions and easily fit for various fields and representing the solution for one or more of the above mentioned inconveniences.

DISCLOSURE OF INVENTION

The solution is given by this invention combining various systems all in one object built in different sizes. It can be placed and concealed also at remarkable distance and through a sheath it can reach the point where the actuator joins the object or lever mechanism which has to be hold or moved. This invention in fact is used to give motion and to hold an object by means of two-fitting-together-section-actuators having different stiffness according to their uses. The device can be equipped with different reels, moved by an electronically controlled engine having a control loop with an electronic microprocessor using also data collecting sensors. Its operations and functions are thus determined by its actuator whose main peculiarity is that of being formed by two different sections separately wound up to a reel or stored into an outside case. The two sections are made up of chips comb-assembled onto a wire. These chips are one to the other identical and fit together so as they can mutually insert one after the other with the small 'male' teeth into the 'female' ones. When coming out of their sheath—necessary when the object connected to the device is rather far away—the two sections are pushed into the appropriate engaging head opposite one to the other and staggered and are forced to unite. The result is one stiff element similar to a pushing or pulling stem and thus acting as a servomotor. In fact it can move or it holds an object once it is assembled. In case of different operating needs, here is the possibility to replace the reel and thus the actuator with a more appropriate one according to need. If one wants it to hang and then pull or else hold an object or mechanism one can choose among more flexible actuators which can also only be wound up. All movement interferences of the object being tied to the actuator are detected by sensors recording all forced movements. The end user can choose among three possible ways to securely deactivate the device: through an electronic key or through a hand-turning knob or through an emergency mechanic key onto the device itself and prevailing even onto the electronic one. This can be useful in some particular and temporary instances, in case of failure or break-into or exceptionally as in the case of a continuous use. Manually one can in any case ensure the release and the opening and closure of the device keeping unchanged the peculiarities of the mechanism.

Moreover, it is important to underline that this device can apply even a remarkable force onto small and hardly reachable points. Another characteristic is the possibility to fit the actuator to objects not necessarily intended for it.

Last but not least, is the possibility of a widespread industrialization of a basic device, irrespective of its final destination. As a matter of fact it is possible to produce the core of the invention—being common to all the application fields—in different sizes changing only the reel and therefore the actuator. Reel and actuator can be sold separately and be different according to the distance to be reached and to the specific application required. Following are some application examples which are not comprehensive but which enhance the identification for uses not mentioned but easily inferable from the examples. The most evident application is as an opening and closing and anti-break-into control. Another is as a monitor and control of structures formed by modular elements such as scaffolding or soleplates as well as the limitation of areas through large arches or perimeters formed by actuators having even large dimensions once they are assembled. All the above applications include the anti-theft and alarm functions with immediate contrast action or warning signal thanks to a piezoelectric siren embedded into the device. This invention, due to its Ethernet connector transfers all detected data such as thrust/draw back movements, noise, temperature—acting then as a fire or weather alarm-pressure—acting as a wind or burst alarm—light for opening and closing of shutters during day and night. The actuator hides fibre optics and a multipolar cable or single conductive threads useful to detect all said data as well as for limit switch. They are all connected to a small electronic device turning with the reel and containing optic sensors as well as a circuit apt to collect and analyse all data coming through the actuator to transfer them by radio directly to the resined card or through the power connection to the reel thus connected to the electronic card. All received data can then be transmitted thanks to easily available equipments via telephone or via wire or wireless nets. Another important and innovative application of this invention is to robotic joints to which, just as it happens in the animal kingdom, it transfers a more elastic and precise movement with larger tolerances when laying or clutching and making it a smoother movement. Also, in case of winding tracks the flexible actuator can reach even difficult and very small points. As a matter of fact, using the appropriate two-section reel and actuator, this latter can as it comes out of its sheath act in the same way as tendons which are connected to the muscles holding or moving a limb though a sheath and the element sliding inside it. At the exit of the sheath and going through the appropriate assembly head the two actuator sections are forced to assemble 'male' into 'female' opposite element in such a way as to make up a semi-stiff or stiff element useful to thrust and give rise to a lever movement or to an object connected to it. When the actuator is rather large and its sections are stored outside the device itself it is possible to form even long beams sustaining emergency equipments like tents or igloos or fences. Obviously, in such cases the actuator must be helped both in the extraction and the rewind phases. The invention can fulfil a variety of technical solutions: it can be applied for security control as well as to move sliding or non-sliding doors, windows and shutters etc. to panels and doors of automatic machines, to anti-accident protections, to halt the rudder such as the engine door in boats etc. In the automotive field it can be applied to the engine bonnet, car boot and LCD display, notebook, seat, case, helmet, as a retractile arm handing out safety belts etc. Also, for the removal or fitting of front or back car lights and in all those situations where today, due to vanguard stylistic solutions the replacement of a component is almost impossible for the final user because of its complex dismounting. Another filed of application is the retailing sector where the device's locking characteristics together with its control, anti-theft and warning features can be helpful, for example, for hanging LCD televisions or art pictures on a wall. The invention can be applied wherever it is necessary to protect valuable goods or objects containing valuables such as free-standing safes. As things stand now no device bears comparison with our invention in some peculiar applications. When built up with the appropriate sizes and thanks to its servo-mechanism and to its actuator in fact it is used to build igloos or fences while nowadays metal bars or extension tubes are used maybe mechanically controlled or one to the other assembled.

This invention is mainly formed by a special actuator, having different shapes and sizes, which transmits motion to an external object and which can go through an appropriate sheath having different lengths. On top of the sheath an engaging head useful to enhance the actuator's stiffness. This latter is fixed to and wound up to a reel which is easily removable through the removal of a cover and is placed into an appropriate hollow. The actuator is also connected to a motor-driven hub onto a supporting case formed by a parallelepiped turning around one apex as explained further on.

The overall control of the device's functions are two electronic cards resined into a container so as to be water-resistant comprising two separately fed electronic circuits. The primary circuit microprocessors control both the feeding and rotation of the engine as well as the connection or disconnection system. The second circuit is independent from the first one and is equipped with a proximity key and is fitted to the electromagnet supervising the manual locking/unlocking.

The functions for the engine programs, the key-circuits and the sensors can be selected or defined through a connectable and removable numeric pad having an LCD display. This is not shown in the enclosed figures as it is of common use. There are also an Ethernet connector and a USB port situated on the small panel on the device's case. The common user can choose among different primary and secondary functions selecting them from a given list. Also, an engineer or a more expert user can access all data via a computer and a serial USB or Ethernet line and thus decide when the electric engine should start or stop, if and which sensors should control its operations, when the data coming from the strainmeter should be considered, when the engine feedback speedometer control or the inductive crown gear sensor should intervene or he may choose not to change what was set by the manufacturer. Further selectable functions are the engine on/off control or with an all-time feeding, electronically controlled by even remote serial protocols. The two way data allow to control the status of all digital and/or analog signals sent and received through an external Ethernet line as it happens in the new domotics or building-home automation fields. These signals can also be sent through easily available wireless equipments. The invention includes other electronic sensors detecting pressure, temperature, light, noise, vibration and movement of the locked or protected object or lever. The end user can also choose to want a siren to go off when either the actuator or the device itself or the connected object are put under stress. All recorder information is available on serial line and can then be sent through the network to be received by an external controller.

This invention can be applied whenever the application of one or more devices near the operating point is unaesthetic or even practically impossible because of restricted space or hardly reachable fitting points. Since this device and be fitted far from the point where it should act and be hidden, it does not impair the aesthetic and moreover is not easily detectable by burglars. Also, the space it occupies is restricted even in case of long actuators runs. The fitting is easy as well as its adaptability by the end user according to the use and the distance to the application point. These and other characteristics shall be more apparent with the explanation of one embodiment of the invention given as an example and not at all limiting the invention to the particular form disclosed.

BRIEF DESCRIPTION OF DRAWINGS

FIG. 4: the exploded view of the locking device execution explained here.

FIG. 5: showing an enlarged set-reset-microswitch leverage depending on the engine rotation.

FIG. 13: showing another winding-type reel suitable both for thrusting and drawing back the actuator contained therein. The one-element-actuator is also shown as well as its transmission electronic part. Evidencing the electric wires and the optic fibres inside the actuator.

FIGS. 14, 15, 16: showing different types of reels suitable only to draw their actuators back and the equipment for data transmission by radio and the reel electric connection. Evidencing on a section the electric wires and the optic fibres inside the actuator.

FIGS. 20, 21, 22, 23: showing one type of engaging head, sheath and prismatic two-section-actuator both in assembled and in disassembled views. Evidencing on a section the electric wires and the optic fibres inside the actuator.

FIGS. 24, 25, 26 and 27: showing an engaging head, sheath and two section cylindrical actuator both in assembled and disassembled views. Evidencing on a section the electric wires and the optic fibres inside the actuator.

FIGS. 28, 29 and 30: showing some two-dimension working examples with some of the several possible versions of prismatic or cylindrical chips with female embosses on top and male on the bottom or with smooth blades which can be assembled in different overlapping manners so as to form different types of actuators.

FIGS. 33 and 34: showing two possible uses of the actuator as supporting beams of igloo buildings or as a controlling fence.

BEST MODE FOR CARRYING OUT THE INVENTION

Figure 1:
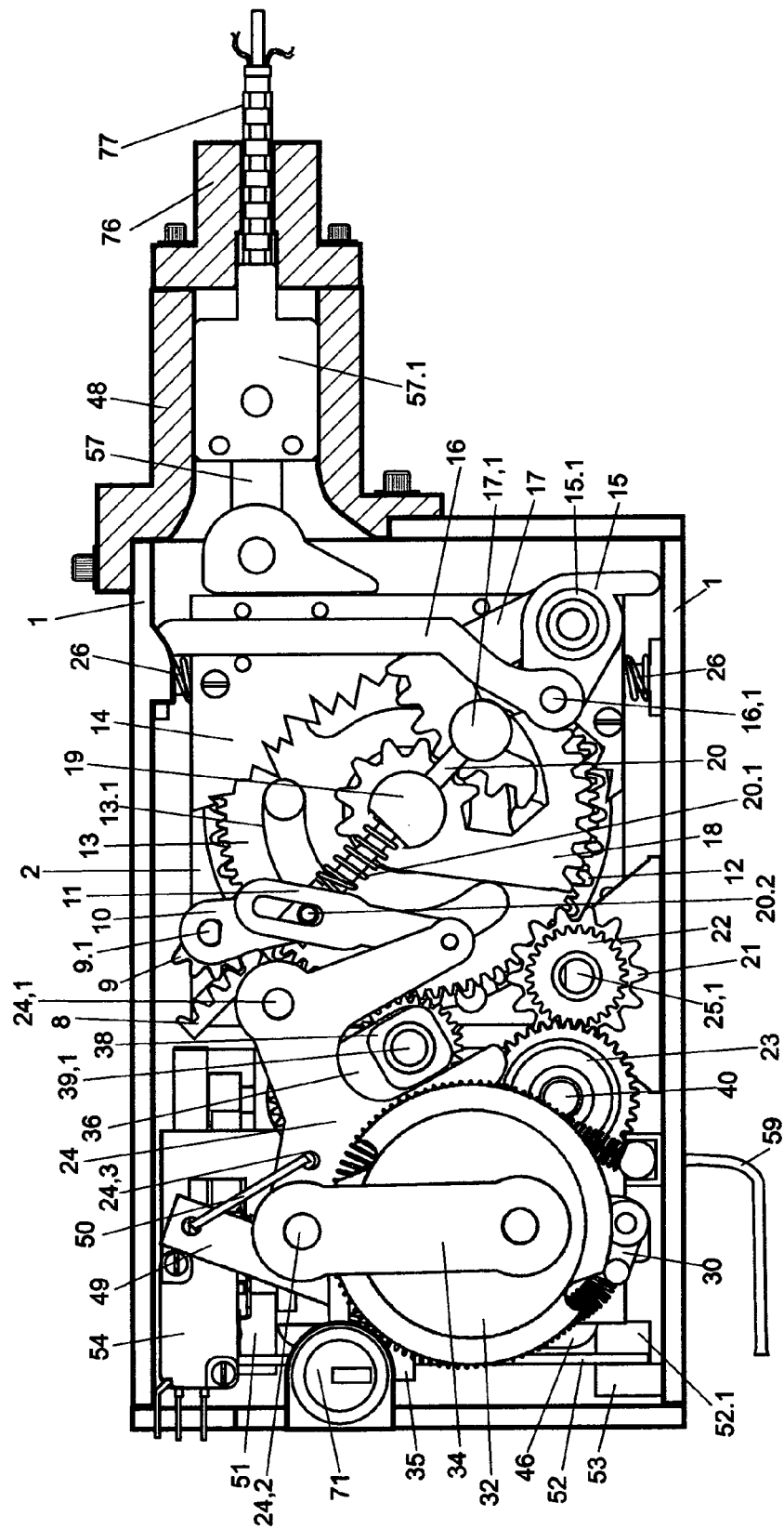
FIG. 1: shows the front view of the overall locking device with manual release.
Figure 8:
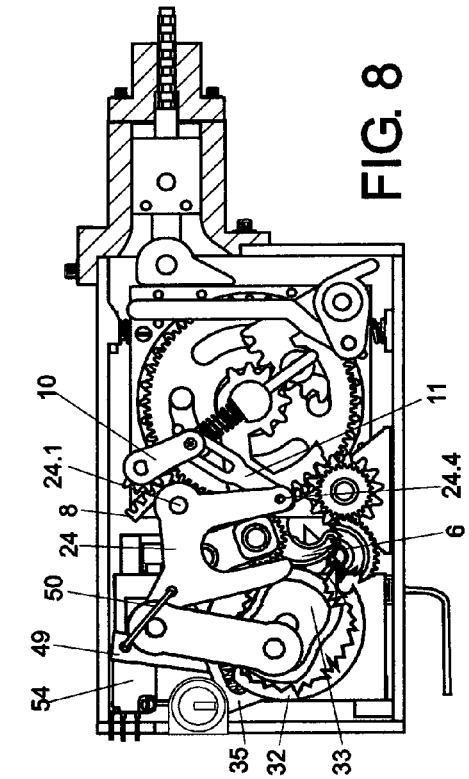
FIGS. 8 and 9: evidencing the 'eight' shaped cam touching the friction trigger and the different phases of the latch manual release.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims. The following description focuses on one particular execution of this device as locking and servomotor. Referring to the enclosed drawings the device is mainly made up of a parallelepipedon containing box FIG. 1 and FIG. 4 (1) in the form of a parallelepiped inside which a cuboid metallic or plastic case (2) having always two square faces is pivoted eccentrically to a pin (3). In the centre of this square based case is a cylindrical hollow (2.1) whose base diameter is slightly smaller than the side of the case base square and whose height is about one third of the hollow. It has a fulcrum hole (2.2) at its bottom and two side by side holes (2.3). This hollow (2.1) acts as a container of the unit made up of a hub (5) whose diameter is some millimeters smaller than the hollow, onto which are fitted a blocking crown gear (12) and a driving gear (13). The hub (5) can be made of metal or plastic. Onto its coupling face are diecast both the pin (5.1) and a centering edge around which a series of small cylinders (5.2). These act as holding and fixing pins whenever they are cold or hot hammer riveted thus blocking both the main crown gear (12) and the gear (13) through four slots (13.1). If production is made through an automatic machine tool it is also possible to fit the above cylinders (5.2) via threaded holes and screws. In this hub (5) inside and opposite the fixing face is a hollow (5.3) deep enough to contain a cylindrical bowl-shaped case FIG. 4 (7) including a spiral band-type spring (7.1) kept wound by the bowl edge and fixed to it in a slot to which it is hooked. This bowl-shaped case has a central bottom hole allowing the hub pin to go through it and two holes (2.3) to fix it to the cuboid case (2). It can be screwed if the emergency rewind of the actuator in the manual mode is to be performed or it can be left free if the reel is to turn freely for example in case of very long actuators. The central end of the spiral spring is fixed to the fulcrum pin inside the hub FIG. 2 (5.4) in a holding slot dividing into two halves the pin end. Also, inside the wall of the cylindrical hollow FIG. 4 (2.1) and sliding onto it is an open ended spring strap (4) used as clutch or break onto the hub. This strap (4) has the same height as the hollow (2.1), is longer than its circle and has the two ends coming out of the hollow (2.1) through a slot. One end is screwed to the cuboid case (2) while the other is fixed to a trigger (6) projecting towards the pulley FIG. 8 (32) useful for the manual release of the device. This pulley turns manually and thrusts the trigger (6) through an "eight" shaped cam (33). The trigger (6) in turn makes the spring strap to tighten around the hub FIG. 4 (5) acting as a clutch. The clutch or break friction adjustment is determined by the end user during the actuator manual release so as to avoid its free and thus too abrupt and sudden unwinding. On the opposite side of the device as described above is another cylindrical hollow FIG. 2 (2.4) in the cuboid case (2) lined up with the hole (2.2) similar to that on the opposite face. Two slots (2.5) and (2.6) connect the cylindrical hollow (2.4) with the outside. More particularly the slot (2.6) is a prearrangement to receive an incoming external actuator needed in case a special version illustrated further on. Through the slot (2.5), instead, goes the actuator coming out still divided into two sections through the extractor FIG. 3 (27B) and FIG. 4 (27A) screwed through a threaded hole FIG. 2 (2.7) and chosen according to the type of reel FIG. 3 (28A) and its associated actuator. The extractor is forced to remain in its position by the pin (27.1). On the outside of the extractor is a guide rod (57) and a small piston (57.1)—shaped according to the type of actuator—sliding inside the cap (48) supporting the actuator's sliding movement before it reaches the sheath and the head FIG. 4 (76) fitted to the overall containing box. The fulcrum hole FIG. 4

Figure 2:
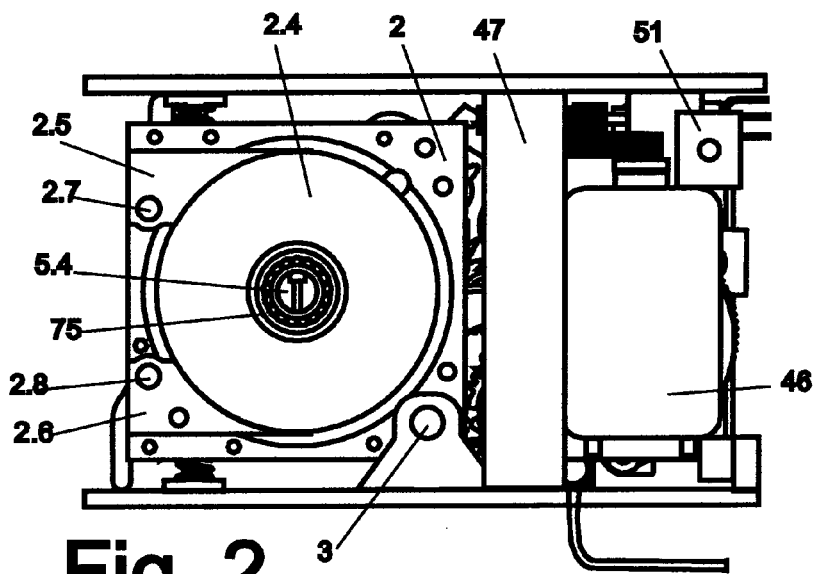
FIGS. 2 and 3: same as above but rear view evidencing the hollow containing the reel and a position of the engine. The second picture showing a version with ratio motor and worm screw, with extractor and reel.
Figure 3:
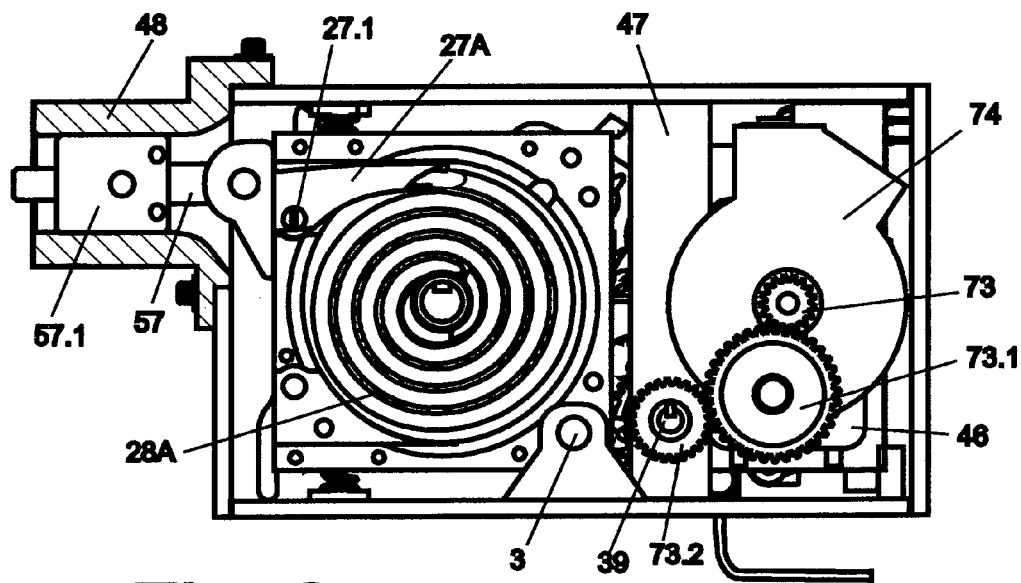
Figure 12:
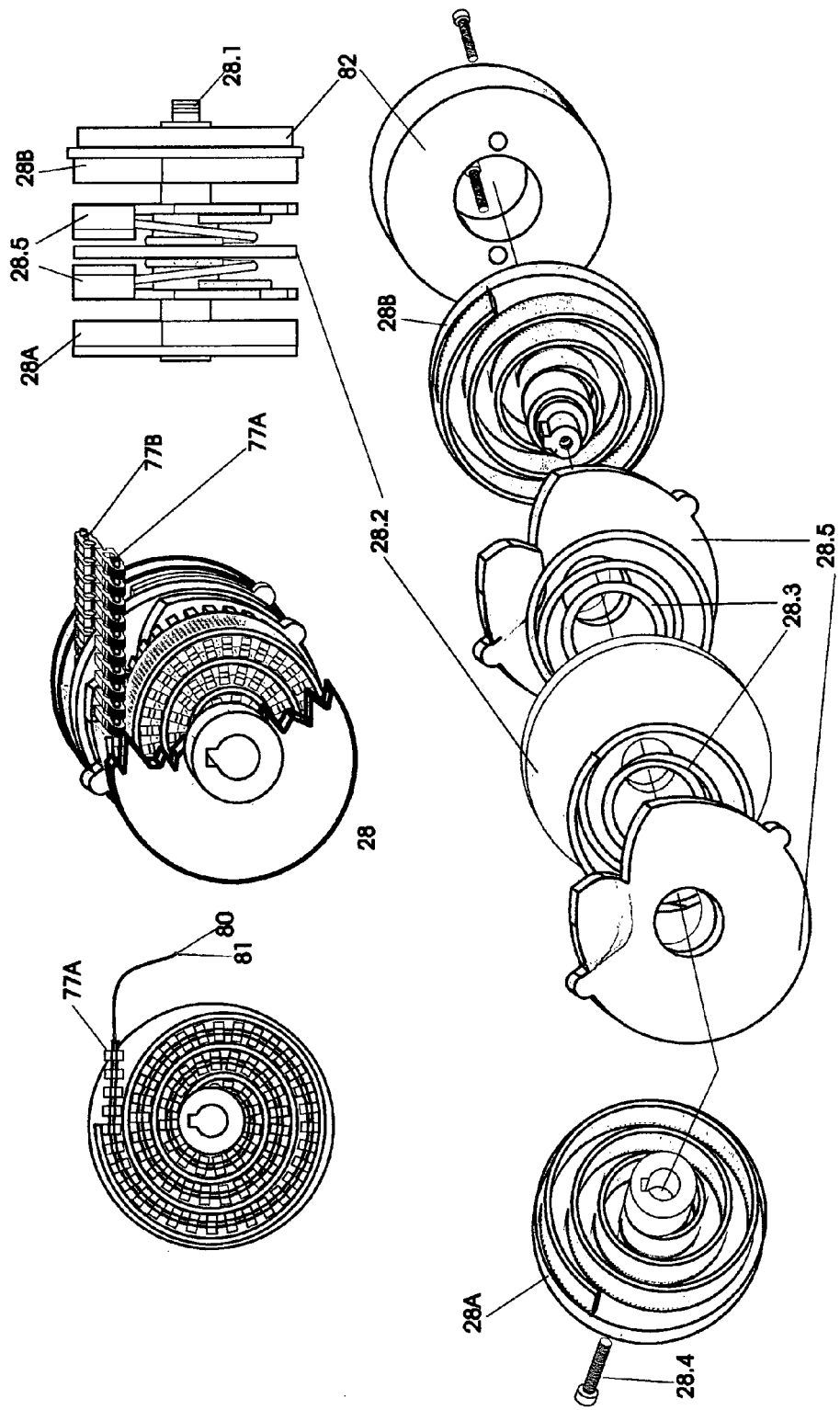
FIG. 12: showing various views of the reel as well as the exploded view of a spiral reel suitable both to thrust and draw back different modular and assemblable actuators stored into it and the connection electronic part. Evidencing on a section the wires and the optic fibres inside the actuator.
Figure 17:
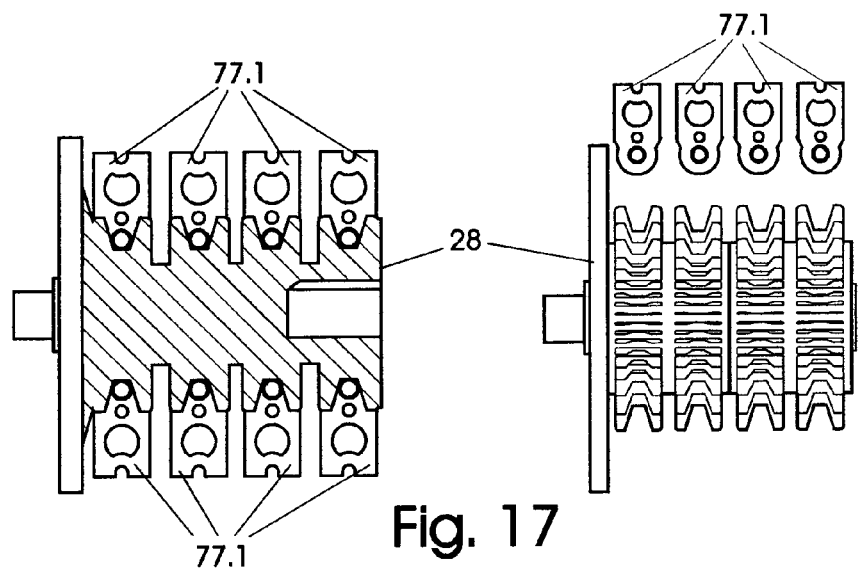
FIGS. 17, 18 and 19: showing two types of reels suitable both to thrust and to draw back modular actuators stored in external containers and a central view of more sections of the actuator.
Figure 31:
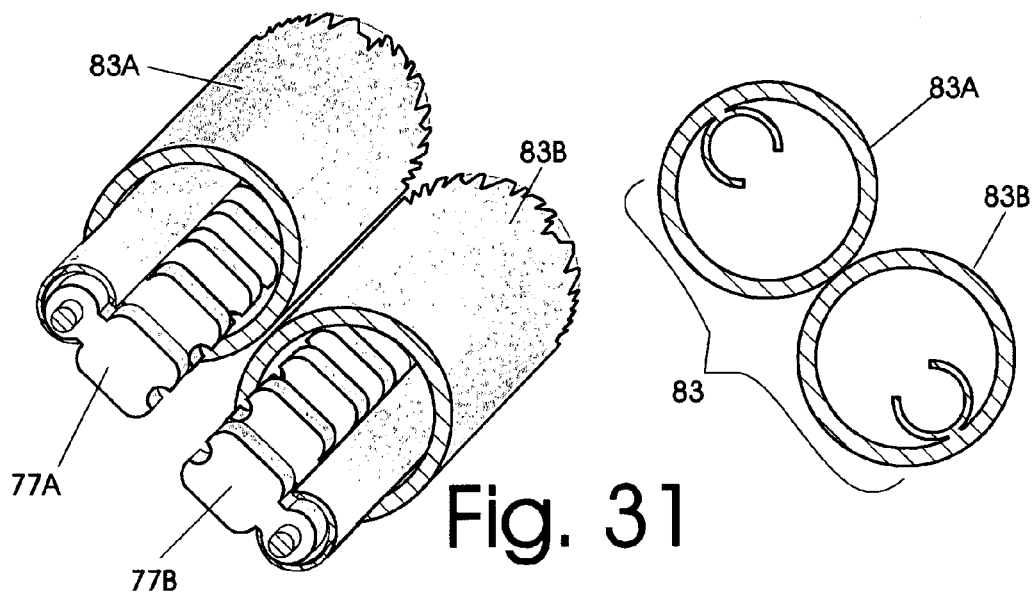
FIG. 31: showing a type of cylindrical sheath having an inside channel guiding the elements of the actuator sliding into it divided in two sections.

(2.2) having inside a bronze bush or a ball bearing FIG. 2 (75) is the same for both hollows and through it comes out a grooved pin (5.4) useful to couple the drive from the hub to the reel FIG. 3 (28A) and FIG. 4 (28). Different types of reel FIG. 14,15,16 can be fit according to the device final destination and to be certain that their rotation is not prevented each is suitably grooved with the appropriate pattern to contain its own actuator. The actuator's drive can be used in two ways: the first only to draw back and the second to draw back and thrust. In the first instance every type of replaceable reel shall be appropriately deeply-wrought and in bas-relief depending on its final use for the housing of either a band or a double version belt FIG. 15 (79). In this latter case the actuator will be rather thick and be made of plastic or fibre or mixed, so as to be wound up and pulled out and to contain fibre optics (80) or electric wires (81). Another type of reel FIG. 16 for modular actuator's types or for a simple version chain (79). Obviously more mixed simple or double version actuators are possible to be used with the same reel type. In case a steel wire FIG. 17 is used, for example, a tread having deep enough grooves to lodge the cable (79) or parallel spiral wire to prevent overlapping or intertwine. The different reels described above have both a DC contact connection FIG. 15, 16, 17 (28.1) inside their pins and also one or more fibre optics (80) inside their actuators either interwoven with their composing elements or inserted and contained in the material they are made of together with electrical wire (81) useful to transmit various signals to or from the resined electronic card (82) inside the reel and subsequently by this one transmitted by radio to the main one in the device. Other reels FIG. 12, 13 belong to the second type and are used whenever one wishes to use the device as source of movement not only to draw back but also to thrust. In this case the principle underlying the reel design changes. In its simple version FIG. 13 the reel is wrought with a non-stop winding groove only on the hub base so as to ensure the tidy winding and above all the unrolled coming out of the actuator from the device. Just like a pinion with its chain so the sides of the winding groove on the hub base act like drive thrust made up by the retaining sides that turn pushing like a thrusting tooth on the actuator's rib (78) or on its modular chips taking it to an extractor FIG. 3 (27/B) which takes it out and guides it. Due to the winding rotation the extractor (27) makes a half turn allowing it to follow the entire extraction of the actuator on the grooved winding. As a result the actuator through the exit slot, the guide rod (57), its piston (57.1) and through the sheath when necessary reaches the point of use where the engaging head FIGS. 20 and 24 (76) is placed. The extractor FIG. 4 made up of two sections (27A and 27B) acting as sliding elements is formed by a double bronze or anti-wear lever having a 'U' shaped cross section hinged through a fulcrum pin (27.1) placed at the exit end in a way to fix also a small sliding wheel (27.3). The extractor has a wedge-shaped top (27.2) driving the actuator out as it is forced to move inside the guide formed by the winding groove on the reel base (28) FIG. 3. Each extractor is suitably sized both in its exit channel and in its extraction wedge according to the size of the corresponding winding groove for its own actuator. Obviously (FIG. 4 (27)) more side-by-side extractors can manage the concurrent extraction of two or more actuator's sections (77A and B) coming from the same reel FIG. 12 and becoming one actuator. This particular type of reel is in turn made up of two parts (28A and B) whose winding groove is deep enough to contain more than the actuator's half-height. These two hub faces are wrought with a continuous winding groove onto their opposite and one to the other mirror planes. The remaining space between them is such to enable the actuator's extraction and is split in two halves by a separating disc (28.2) placed in the point where the two hubs' fulcrum pins. Two tapered springs (28.3) are compressed each on one sliding and guide-shaped disc (28.5) useful to extract the two sections of the actuator and opposite one to the other and on the opposite sides. The whole mechanism is assembled to a central thread (28.4) to make up one reel. The two opposite spirals inside the reel act as partial casing for the two actuators retaining their length is such a way as to push them to slide and fit together while coming out. On the male reel pin is a double electric contact (28.1) which can feed it with a DC tension also when it is rotating. This feeding is useful for the resined electronic card (82) inside the reel to which all electric wires (81) and fibre optics (80) inside the actuator's sections are connected. Beyond the extractor, the engaging head FIG. 20, 24 (76) joins the two actuator's sections (A) and (B) coming from the same reel. The most adaptable actuator FIGS. 22, 23 and 26, 27 is made up of two identical sections (A) and (B) formed by the same sequence of prismatic chips (77.1) having different shapes but identical symmetric matching opposite faces shaped 'male' (77.2) on one face and 'female' (77.3) on the other. One face must have one or more raising elements forming the male hook and a small side tooth contrasting any side thrust while the other face of the prismatic chip having the same pattern but opposite and matching the other one. These chips are set at a distance one to the other equal to a chip's thickness and are kept in place and joined by a steel or fibre cable (77.4) going through an end which can in turn contain fibre optics and/or electric wires and overlapping in a comb-like sequence FIGS. 23 and 27. Unlike other actuators, the two sections (A and B) can slide inside the sheath FIGS. 21 and 25 (83) which can bend in all directions and which can have a rectangular or circular cross section, with inside guiding channel or be shaped like the actuator. The sheath can be modular and thus provided with bent or straight elements joining together in order to adapt to any type of route. In other instances here are flexible cylindrical sheaths able to bend in all directions and having inside 'C' shaped channels FIG. 31 in order to keep in place the actuator's elements on the side of the driving wire onto which the thrust or drawing back actions are exercised.

Figure 6:
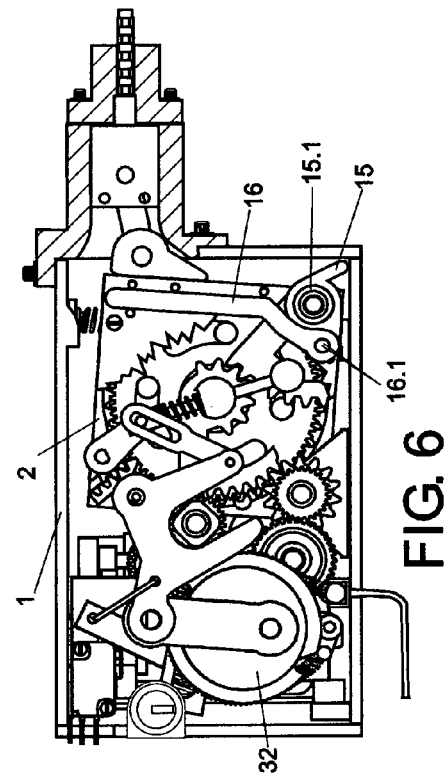
FIGS. 6 and 7: showing the locking device undergoing the thrusting and draw back stress applied to its actuator.
Figure 7:
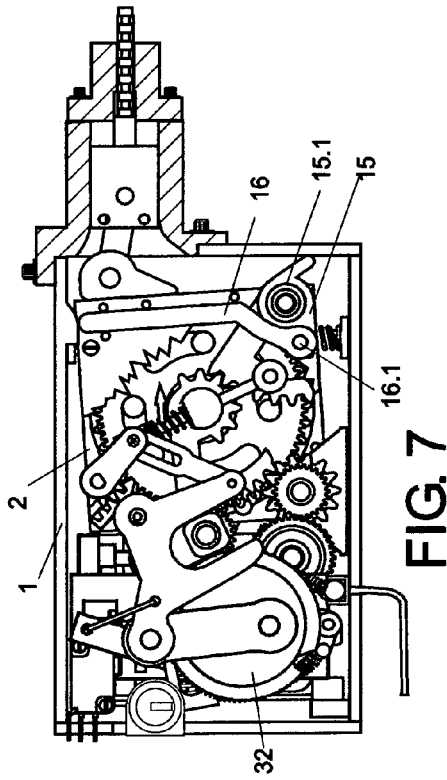

Once the chip-formed actuator's sections reach their final point coming out of the sheath (83) through the engaging head FIG. 20, 24 (76) can engage one after the other with the small 'male' teeth into the 'female' ones pushed inside the head to unite by way of the two funnel-shaped channels helped by two small wheels (75-75.1). Obviously one can have different sequences and joining patterns depending on the chip's shape FIG. 28. These can be pentagonal, hexagonal, elliptical, circular, prismatic, identical and opposed so as to couple male and female. Their two main faces can also be smooth and only have the indentation on the opposite side of the holding wire FIG. 30 or two wires for each section FIG. 29 or only 'male' on one side and all 'female' shape on the other but always fitting one into the other so as to keep the device's operation unchanged. This is so since these are metallic or plastic chips hinged together in a way that their two sections FIGS. 22 and 26 (A and B) join together in a staggered manner i.e. in such a way that the joining faces on one section match always the mid point of the chip on the other section in order to build a straight and stiff element functioning like a thrusting rod. Hidden inside each actuator section (A) and (B) is fibre optics (80) and a multi-core cable or single electric wires (81) useful for different types of measurements. They are all connected to the small electronic equipment FIG. 12 (82) rotating together with the reel and containing optical sensors and a circuit useful to gather and process data and to transfer them by radio directly to the resined card FIG. 4 (72) or through the feeding connection (28.1) to the reel which is then connected to the main electronic card (72). A different result is obtained with a single actuator FIG. 13 (78) made up of various cylindrical elements (78.1) all having the same diameter as the winding groove on the reel. Also two small cylinders (78.2) contained inside a rubber hose (78.3) acting as a spring, which keep the elements apart and assembled at a distance in such a way as to give more stiffness useful for the actuator's thrust. All cylindrical elements have the same height and are in an alternate series thus one on top of the other and at the same distance one to the other for the whole needed length. They are kept in their place and joined together by two steel or fibre cables containing in turn fibre optics (80) and/or different electric wires (81) passing through the cylindrical spacers. This actuator can be moulded in plastic with fibre optics and electric wires inside. In this case the rubber hose (78.3) is not used as the stiffness is reached by the whole molded actuator. On the two opposite faces of the cuboid case FIG. 4 (2) and acting as a container and support to the whole mechanism are two quadrangular plates (14) and (29) like two lids having each a pivot central hole situated on the same axis as the reel (28) and the hub (5) kept in place by ground pins and screws. Forced to their position and contained by the same plates (14) and (29) and situated on the left of the actuator's exit (2.5) are placed in a hollow a bolt (8) and a sector gear (9) pivoted to a splined pin (9.1) to fix the small lever (10) placed outside the lid (14) and the cuboid case. This can move eccentrically around the pin (3) catercorner opposite to the actuator's exit (2.5) and it can turn both in clock-wise and anti-clock-wise directions and with a few millimeter's run as long as the movement is allowed, i.e. within the limits of the overall containing box (1). These two travel directions are useful both to absorb and to detect thrust or draw-back movements of the object connected to the actuator (77). The resulting forces are transferred to the cuboid case (2) via two springs (26) and then to two feelers (15 and 16) and rubber stop springs (26.1) placed on the cuboid case (2)'s lower and upper leaf vertex respectively. The two springs (26) are of the type used for holding dies, are placed upon other two rubber springs (26.1) and press to deflection two metallic chips (55) onto which is an electronic strainmeter sensor for the pressure detection fixed to its position by a shaped washer (26.2). At the same time as the electronic survey also a tracking of the mechanic movement stress FIGS. 6-7 is carried out. And this is possible through the lever (16) acting as upper feeler for thrust monitoring which is coupled though a pin (16.1) to another lever (15) fitted to a free release bearing (15.1) connected to the pivot pin and which instead registers a draw-back movement. These feelers (15 and 16) detect and transfer the case's (2) movement inside the overall containing box (1) to limit stop whenever a significant force is applied. They go back to the apex' sides and cause a chain reaction wherein even if the detection starts from the upper feeler (16) the lower feeler (15) comes in making a half turn. This unit through the free release bearing (15.1) blocked for that turning direction, pushes a fan-shaped sector gear FIG. 1 (17) having a much longer radius than the feeler and engaged to component (18) making it turn half way. The component (18) is designed to reset the device and has a hole acting as rotation centre to seat the pin (5.1) useful to centre the hub-main gear wheel group and is made up of two toothed diameters on different levels united into one piece. The smaller diameter engages to the fan-shaped sector gear (17) while the outward toothed side on the larger diameter is engaged to the reset gear wheel (21). Another thrust point is given by the bush (17.1) fitted to the same component (17) into a central hole and beneath the toothing and peripheral to the main diameter. In fact in this bush (17.1) slides the eye shaped rod (20) whose end part is pushed so as to impress a swing movement through the bush (19) inserted at about half of its length and which causes the rotation of the half gear wheel (18) onto the pin (5.1). In fact, the bush (19) is crossed perpendicular to the pin (5.1) by a hole through which goes the eye shaped rod (20) makes it slide through the spring (20.1) which is inserted coaxially and situated between the rod eye collar and that of the above mentioned bush (19) so that being compressed it can stretch and cause the other small lever (10) and the pin connecting the rod eye (20) to move. At the same time this makes the sector gear (9) keyed together with the lever (10) to the fulcrum pin (9.1) turn. As a result the sector gear engaged to the rack on the back of the bolt (8) pushes it to slide into the hollow guide inside the cuboid case (2) until it engages to the corresponding tooth in the crown (12) becoming integral and preventing its rotation.

Figure 9:
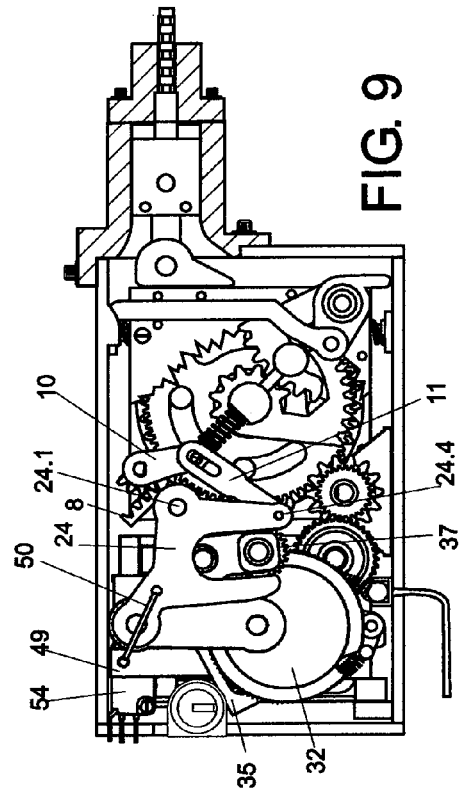

As a consequence the wound-up actuator's sliding is blocked. The mechanism described above acts as a bolt lock and as an additional security protection switching on automatically and acting as a protection of the speed-down group of the electric engine (46) only when the lock is in rest position and an unexpected force is applied to the object connected to the actuator thus preventing its removal or its opening or its damaging or whenever an unforeseen obstacle hinders the planned actuator's travel. The following release of the actuator takes place automatically when the electric engine is switched on again. The engine's gearing down has a shunt engendering a movement of the free release gear (23) and thus resetting the device right from the first engine revolutions. Since there is only one engine (46) managing both the reset condition and the rotation of the crown-gear and toothed-gear unit, it would remain stuck because of the bolt (8) still engaged in a tooth of the main crown gear (12). As a consequence some slots (13.1) have been made onto the gear (13) and inside these slots slide the pins coupling to the main crown gear (12). As a result the gear (13) turns for about one eighth of a turn thus making the engine turn. The gear unit pushes the free release gear (23) to turn as well as the gear (21) fitted to a pinion (22) engaged to the reset half-gear-wheel (18) thus reversing the movement of the mechanism connected to it and releasing the bolt (8). The peculiarity is that the reset gear (18) engages only to and at the same time as the bolt (8) through the pinion (21) integral to the gear (22) to which a fulcrum bush is fitted to turn freely in the pivot pin (25.1) integral to the lever (25) end while the other end of the same lever is centred to the free release gear (23)'s shaft (40). Thus hinged it acts as a removable support kept in its place by a spring FIG. 4 (25.2) placing the pin (25.1) of the gearing (21-22) to limit stop into an appropriate lock seating exactly on top of and on a centre line to the pin (3) around which pivots the cuboid case (2) in such a way that when this moves the contact distance between the still part outside it and the moving part such as the reset gear (18) does not change. The lever (25) is useful when the device is in its manual release condition and the semi gear (18) is forced to move following the rotation direction wherein the free release into the reset gear (23) is stuck, together with the gears (22-21) connected to it as they are hinged to the end of the lever (25) and force it to make an outward rotation getting a thrust when they touch momentarily with the semi gear (18) during the travel and until they keep touching. Once they separate the lever (25) will go back to its start position. The gearing (21-22) described above is an integral part of the reset system and is placed between the semi gear (18) and the free-release gear (23) which transmits movement and sets going only in one direction of rotation, i.e. the direction of the actuator's winding and thus not before opening the bolt (8) in an automatic and motor driven way. At the start the gear with free release bearing (23) will idle until the reset semi gear (18) goes over it and pushes onto the pinion (21) under the gear (22) when it is intercepted by the rotation so forcing also the supporting lever (25) to rotate. The semi gear stands in this position awaiting to be moved in the opposite direction. This happens when the engine is switched on or when the device is released. The movement is generated through two cone-shaped gears (42.1 and 42) transmitting motion from the main gear (44) to the conducting shaft (40) onto the free release bearing with the reset gear (23). Another fork-shaped lever FIGS. 8-9 (24) called main lever, is placed and centred to the pin (24.1) situated on the left side underneath the bolt (8). It goes over the draw-back mechanism and is used for the bolt manual unlocking also through the lever (11) connected through a fulcrum hole onto the fork-shaped lever pin (24.4) at one end and through the slot at the other end to the lever (10) so either taking off or giving motion to the main gear (13) coupled to the crown gear (12) and thus to the hub (5) and reel (28). This action is given by the outward movement until release or the approach until engagement of a pair of engaged toothed wheels (37 and 37.1) receiving always motility as described further on. The lever (24) has the shape of a two prong fork so as to fit into a protruding slot formed by a chip (38) acting as a plug which is free to turn and integral through a shaft FIG. 4 (39) and a pin (39.1) to the supporting 'L' shaped flask (36) together with another mirror one (36.1) useful to contain and support the pair of coupled gears (37 and 37.1) inserted into the shaft (39) and into the pin (39.1). The wheel (37.1) turns freely onto the pin (39.1) but is geared to the other wheel (37). This latter is splined onto the secondary shaft (39) which drives motility and is the anchoring and centre point of this mechanism and therefore acts as pivot in response to the action of the main fork-shaped lever (24). The secondary leading shaft (39) is perpendicular to another shaft (44)—the main leading one—from which it receives motility transmitted by two truncated cone shaped gears (41 and 41.1). The step-down gearset is included in a support (47) appropriately shaped and fixed to the parallelepipedon containing box (1) and disjoint from the cuboid case (2). Into the step-down gearset is also included another secondary shaft (40) perpendicular to the main leading shaft (44) and fixed through a bush of the support (47) onto a protruding wing receiving motility from the two conical wheels (42 and 42.1) opposite and placed about at the end of the shaft (44) so as to give motility to the free release gear (23). Finally on the top of the shaft (44) is a splined a cylindrical gear (43) engaged to a reduction gear of the type illustrated in (45 and 45.1) and onto the gear (46.1) splined to the main driving shaft. Or the valve gear described above is connected to a reduction gear and will obviously vary according to the chosen reduction gear. For higher reduction ratios here is another worm screw reduction gear FIG. 3 (74) coupled to an helical gear with a central one (73) for the exit of motility and through a connecting gear (73.1) to the valve gear with the gear (73.2) splined to the shaft (39) leading motility for the gears included into the appropriate supporting box (47) placed horizontally and thus opposite as regards the plane of the containing box, to the electric motor (46) fitted above it and on the same support. Dimensions and type of electric motor to be used will be chosen according to the final destination and of the size of the device. The engine can also be equipped with a reduction gear directly from the producer. A separating metal plate FIG. 4 (58) fixed to the containing box (1) divides the space occupied by the electric motor (46) and all connected components and supports the manual drive mechanism which is going to be described now. This is fixed to the dividing plate in an almost central position onto pin (58.1) holding the pin and bush tail (35.1) and is the fulcrum of a mechanism made up of a tubular shaped component (35) having two opposite slots. One of them goes from about the top to just before the fulcrum pin and the other slot from the top to about the length middle point of the same component. Inside it is a spring (35.2) pressed by a sliding plate (35.3) shaped in a way as to be introduced into the spring on one side and with a hole on the other to allow the fixing of a pin (35.4) to the supporting 'L' shaped flasks (36 and 36.1) through the sliding slot. This mechanism is useful to keep trace of both the position taken after the possible manual operation to disconnect the engaging pressure and of the motility to the reel between the gears (37.1) and the main one (13). Fitted to the same bush tail (35.1) of the component described above is held and thus centred a lever (49) having the other end shaped like a step to reach and come close to the microswitch contact (54) fixed to the separating metal plate (58) near the edge of the containing box (1). This lever is useful to disconnect the microswitch in case it had turned on. In fact at the end of this lever (49) is a small connecting hole which hooks through a hook ended spring rod (50) to a hole (24.3) situated near the outside edge of the component (24). Obviously, the manual operation will also cause a 30° rotation of the main lever FIG. 8, 9 (24) and thus the coming out of the bolt (8) through the lever (11), the removal and the displacement of motility kept by the tubular spring cam (35) which due to the movement of the thrust axis holds the main lever in its given position thus placing also the strike lever (49) outside the microswitch contact (54) and resetting it. Onto the separating metal plate FIG. 4 (58) is also fitted a fulcrum pin (58.2) allowing the rotation of the shaft and bush of an 'eight' shaped cam (33) and of a pulley wheel brushing the recording spring mechanism described above. The wheel (32) supports different functions and characteristics: if functions as a rod through the eccentric fixing of the pin (32.2) placed near the outside edge and therefore misaligned to the centring hole (32.1). The pin (32.2) is connected to the lever (34) functioning as a rod whose second hole is joined to the main lever (24) through the pin (24.2). Another characteristic of the wheel (32) is a groove onto its circumference having such depth and thickness to contain a spring (60) about as long as the circumference like a wire rope pulley into which slides the steel wire (59) for the manual release. This is not fixed directly to the pulley but to an external lever (31) pivoting onto a pin (33.2). The pulley groove (32) is interrupted by two tooth shaped notches at the opposite sides so as to hook the ratchet gear (30) when turning clock-wise and to release it when turning anti-clockwise i.e. when wanting to release it through the manual rotation of an external knob causing a wire (59) to slide forward or backward at each manual rotation. The wire end is fixed by a pawl to the ratchet gear (30) and pushes it to slide onto the groove until it engages to the first available tooth. This happens because the ratchet gear is connected to the top of the lever (31) hinged to the pulley through the pin (33.2), guides its travel onto the teeth. Therefore the ratchet gear (30) sliding and engaging only in one sense pushes the pulley (32) to turn clock-wise for half a turn. The pulley will then stay in this position thanks to the mechanisms connected to the rods and their spring. Since this spring (60) inside the pulley groove (32) has been compressed it stretches and pushes onto the ratchet gear (30) and the lever (31) making them turn anti-clock-wise releasing the ratchet gear from the tooth takes the whole mechanism back to its stop limit, i.e. to the start position rewinding also the manual release wire (59). Another function is carried out by an 'eight' shaped cam fitted to the same rotation shaft and connected to the wheel (32). Onto this 'eight' shaped cam slides a trigger lever (6) integral to the friction band (4); in fact each wheel rotation as described above generates a friction whose intensity is adjusted by the more or less quick rotation of the manual release knob.

In conclusion, the rod mechanism functions as a set-reset system so that at each half turn of the wheel (32) the device is either locked or unlocked and at the following one it is unlocked and locked and so on. This action operates at the same time on the friction mechanism seen above, useful to avoid the sudden sliding of the actuator onto the reel, being no more constraint and thus ensuring all security requirements although in the manual operation. In any case, both the manual lock and unlock of the mechanism are determined by the position of a block (52.1) which when at rest is interposed between the travel of the lever (31) and a detent (53) acting as a step and fixed upon the containing box (1) making all manual operations ineffective until it is moved by an excited electromagnet (51) operated by a codified electronic control. This magnet (51) is fixed to the end of a long lever (52) appropriately hinged, parallel to the engine (46) and having the block (52.1) at the other side. Another function is given by the electronic control switching off or on the alarm system causing, just for a moment, the rotation in one sense or in the opposite one of the electric engine and this makes the small wings FIG. 4 and more evidently FIG. 5 (61 and 61.1) commute the microswitch (54) electric contact as they are pushed against the gear (46.2) by two springs, this gear (46.2) being splined to the driving shaft with the grooved traction gear (46.1). This can be applied as pure contact as for example to interrupt the switching on circuit in a vehicle thus locking it. On the device there is also a box (72) containing two printed circuit resin bonded against humidity. A piezoelectric siren (62) comes out of the box and is used for anti-theft alarm or to produce acoustic signals of different length for various purposes. The siren is controlled by the alarm system integrated in the program inside the microprocessor, as well as the sensors on the cuboid case (2) controlling pressure, strain gage (56), inductive (63), piezoelectric-microphonic (64), temperature (65), possibly photoelectric (66), laser diode (67) for the connection to the fibre optics of the actuators placed outside the device. Last, a circuit receiving the radio signals coming from the circuit (82) included in the reel. The programming or the transfer of data is carried out through two connectors for an Ethernet (69) and an USB (68) line coming out as well from the box containing the electronic circuits situated behind a small panel (70) on the overall containing box. The last mechanic unlocking device, instead, is a conventional lock operated by a mechanical key (71) fitted directly onto the outside cover of the device containing box (1) and whose revolving plug is ends with a small lever (71.1) in contact with the spring recording mechanism (35).

Figure 10:
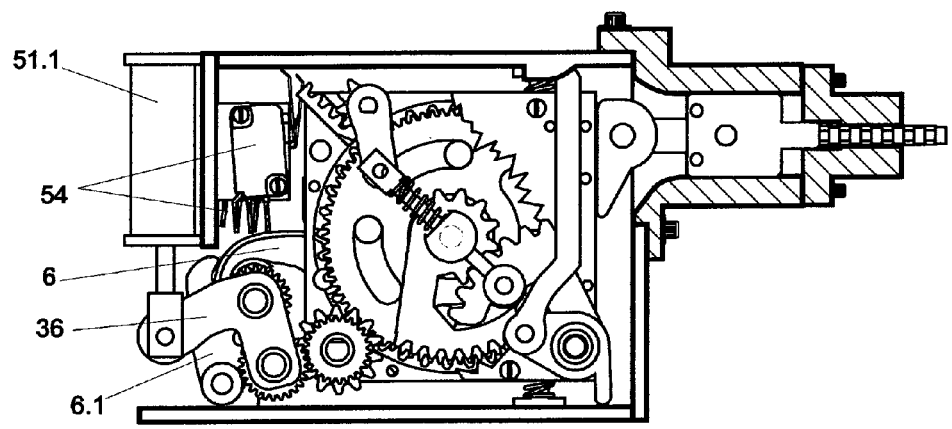
FIGS. 10 and 11: showing a possible application of the device as servomechanism suitable to different uses. The second showing more elements fitted to one engine useful in different robotics applications.
Figure 11:
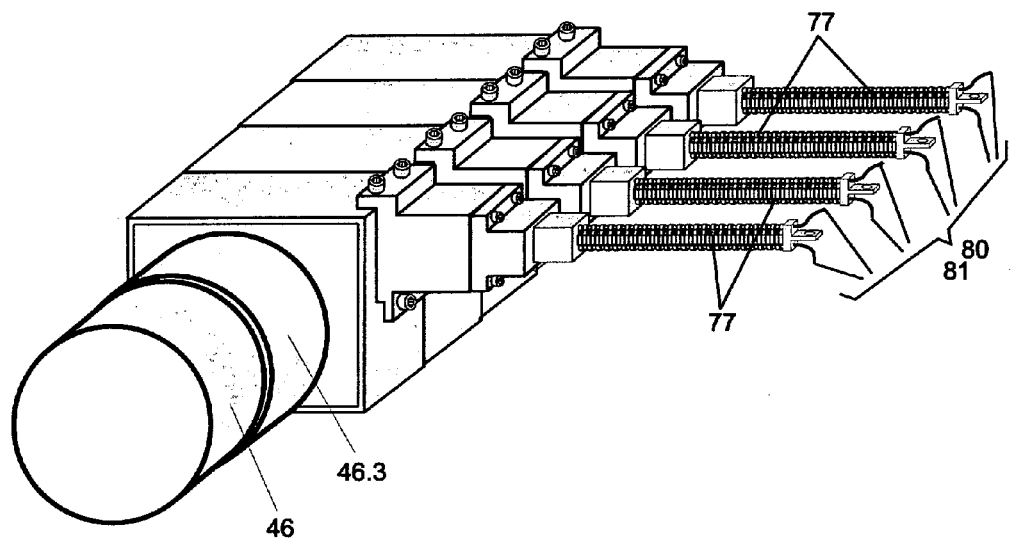
Figure 18:
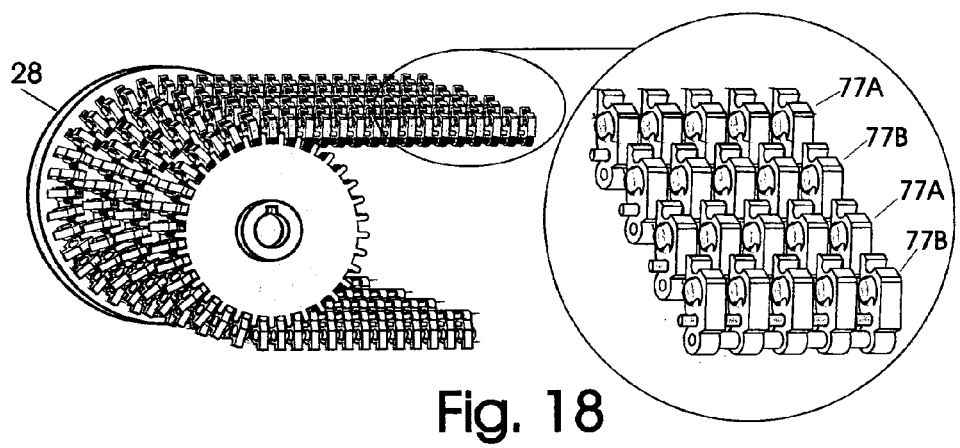
Figure 19:
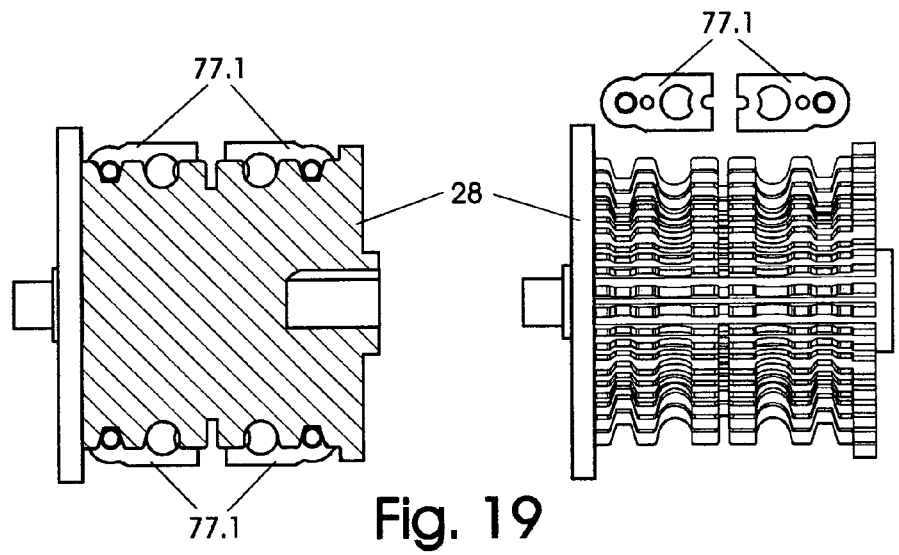
Figure 32:
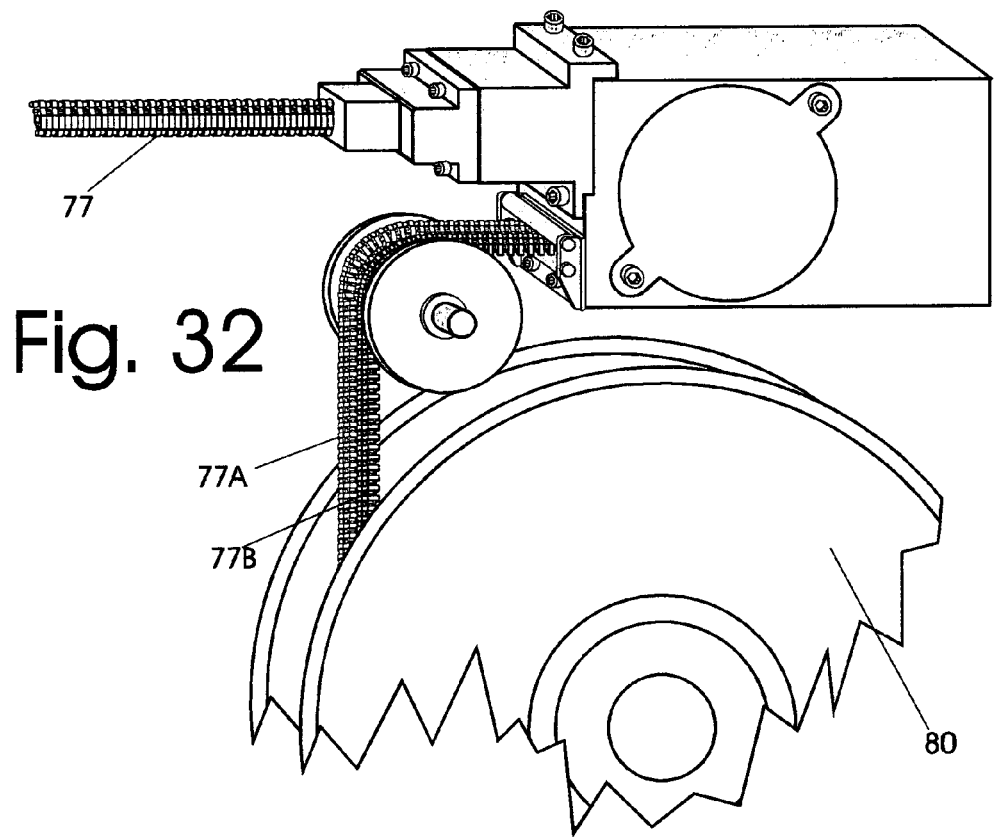
FIG. 32: showing a practical version of this invention having a reel suitable for a very long actuator stored around a coil or container outside the device.

A different version of this device for example can be made excluding the spiral band spring (7.1) used for the emergency rewind of the actuator by removing the fixing to the cylindrical bowl-shaped case (7) which holds it through the screws into the holes (2.3). This way the reel will rotate uninterrupted thus allowing the control of rather long actuators of the type formed by two identical or matching sections which in this version are contained in one or more reels as separate tank FIG. 32 (80). The reel FIGS. 17-18-19 is made in such a way as to be able to thrust efficiently, its surface has two toothed grooves in bas-relief with the same impression, one in width and one in height respectively of the hooks of the two identical sections which will form the coming out actuator. The impression will be calculated exactly according to the bend made by the wrought faces of the sectioned actuator's (77.1) placed onto the reel. This is necessary to have a pulling drive as well as a perfect thrusting action onto the actuator. The reel FIG. 17-18-19 becomes a driving force similar to a toothed pulley but with a 'holding' effect useful to avoid that the teeth integral to the actuator's sections are unhooked. Once hooked onto the reel they shall remain tight and this will allow to push the two sections which will then be pulled out and driven to unite into the engaging head making up a stiff coming-out stem reaching even considerable lengths. The two actuator's sections shall be introduced separately through a guide fixed to the threaded hole (2.8) into a slot FIG. 2 (2.6) situated under the one used for the exit of the actuator FIG. 2 (2.5). This version allows the two sections to be assembled through the 'male' and 'female' hooks to make up very long rod-like actuators to be used, for example, not only to make large igloo FIG. 33 or folding doors or to move partitions but also to create long holding poles for example for field tents or protection barriers FIG. 33 all wound up in easy-to-be-carried-reels which can then be quickly assembled if the need arises. Another version of this device can be made without the engine or the electric connection to accomplish only monitoring and long-term locking. Yet another version can be made without the engine and without the manual locking-unlocking mechanism FIG. 10 and coupling two or more cuboid cases one near the other FIG. 11 all connected to only one engine FIG. 11 (46) and one reduction gear (46.3) with drive connection and disconnection selector (36). This reduction gear is coupled also to the friction or breaking action through the swinging lever (6.1) operating the trigger (6) dependant from the electromagnet's (51.1) action. This way it is possible to have a high integration in very small spaces for servomechanisms useful to make different movements such as in the robotics field while keeping all the main characteristics of the device unchanged thanks to the electronic part with sensors.

Figure 35:
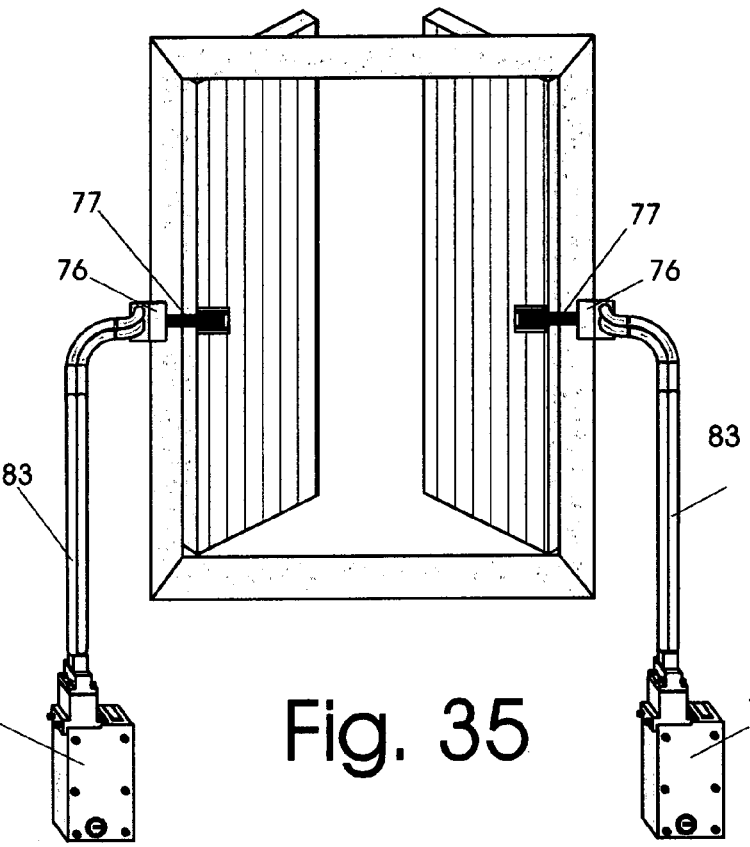
FIGS. 35 and 36: showing two possible installations of the device as automatic shutter and door opening and closing mechanisms as well as a particular application as mechanism to hand out car seat belts.
Figure 36:
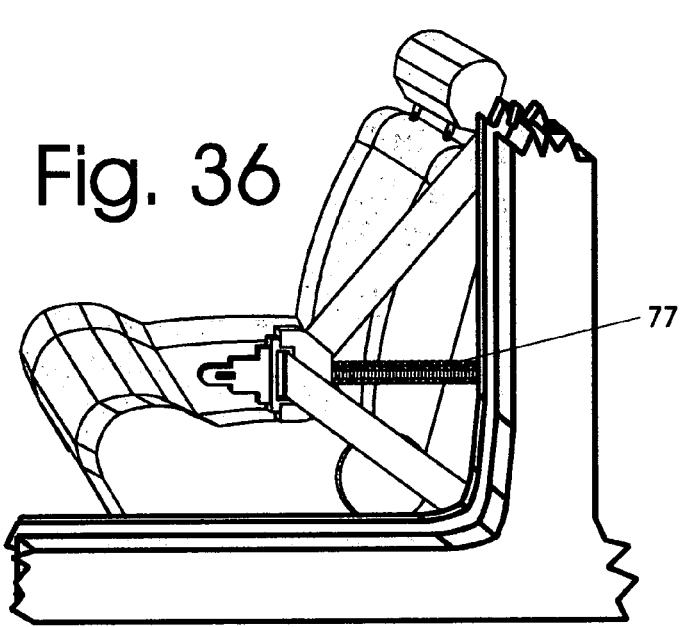

Other two further example applications of the device described above are illustrated at FIG. 35 and FIG. 36. The first one shows the device as used to open and close the shutters of a window, with the device case placed far from the actuator's application point. The second figure shows the possible use in a car. Placed next to the seats the actuator is used to hand out the safety belt.

The components, dimensions, materials, shapes and the like making up the invention can vary without falling out the domain of the present patent; besides all elements are replaceable with other technically equivalent.

The invention claimed is:
1. A multifunctional locking device comprising:
   a housing;
   a servomotor in the housing;
   an actuator;
   an interchangeable reel in the housing, the reel defining a reel axis, the reel being driven about the reel axis by the servomotor;
   a sliding sheath including an end; and
   a funnel-shaped combining head at the end of the sliding sheath,
wherein the actuator acting as first fixing point, comprises two comb-like sections to thrust when the sections are forced to assemble opposed and staggered, outside the housing, at a distance from the housing, the sections become rigid whenever forced to go through the funnel-shaped combining head at the end of the sliding sheath,
each actuator section comprising an optical fiber and a multipolar cable for distance monitoring, the actuator being windable around the reel, the reel acting to wind up the actuator onto worm screw grooves and;

a circuit in the housing, the circuit being driven about the reel axis by the servomotor, the circuit being configured to receive a signal from the optical fiber of one of the actuator sections and transmit the received signal in a wireless manner, whereby the multifunctional locking device is both a source of motion and a locking and monitoring device when connected to an object and an opposing point.

2. A multifunctional locking device comprising:
a housing;
a servomotor in the housing;
an actuator;
an interchangeable reel in the housing, the reel defining a reel axis, the reel being driven about the reel axis by the servomotor;
a sliding sheath including an end;
a funnel-shaped combining head at the end of the sliding sheath;
a mechanical clamp acting onto the reel and thus on the actuator,
wherein the actuator is extensible and flexible until the actuator reaches an application point, beyond the application point the actuator becoming stiff so as to either hold steady or become a source of movement for any object or mechanism connected with the actuator, wherein inside the actuator are hidden fiber optics and a multi-core cable or single wires useful for the measurement of environmental conditions, of events, housebreaking and stop limit stress; and
a circuit in the housing, the circuit being driven about the reel axis by the servomotor, the circuit being configured to receive a signal from the actuator and transmit the received signal in a wireless manner.

3. A multifunctional locking device as claimed in claim 2 wherein the actuator sections are comb shaped.

4. A multifunctional locking device as claimed in claim 3 wherein the sections of the actuator are formed by prismatic, cylindrical, elliptical chips or chips having irregular shapes.

5. A multifunctional locking device as claimed in claim 4 wherein the chips are inclined so as to affect a direction of the actuator.

6. A multifunctional locking device as claimed in claim 4 wire or cast-in cable passing through the chips of one of the sections, thereby keeping the chips of the one of the sections together.

7. A multifunctional locking device as claimed in claim 6 wherein one of the sections of the actuator includes extruded fiber.

8. A multifunctional locking device as claimed in claim 3 wherein one of the sections of the actuator includes injection-moulded material.

9. A multifunctional locking device as claimed in claim 2 wherein the device is configured to operate with different types of reel.

10. A multifunctional locking device as claimed in claim 2 wherein the reel includes two halves joined together.

11. A multifunctional locking device as claimed in claim 10 wherein the reel includes an endless screw groove.

12. A multifunctional locking device as claimed in claim 2 wherein the reel is made of one and only piece.

13. A multifunctional locking device as claimed in claim 2 wherein the reel includes a toothed surface.

14. A multifunctional locking device as claimed in claim 2 wherein with reel includes side-by-side parallel grooves.

15. A multifunctional locking device as claimed in claim 14 wherein the actuator is made of plastic.

16. A multifunctional locking device as claimed in claim 2 wherein the reel includes a DC contact.

17. A multifunctional locking device as claimed in claim 2 further including an extractor for each section, the extractor including a guide rod.

18. A multifunctional locking device as claimed in claim 2 further including two wheels for sliding and forced joining together of the two actuator sections.

19. A multifunctional locking device as claimed in claim 2 wherein the sheath defines two channels.

20. A multifunctional locking device as claimed in claim 2 wherein the device defines a cylindrical hollow to contain the reel, the cylindrical hollow being divided by a wall having a hole and a seat for a bush or bearing.

21. A multifunctional locking device as claimed in claim 2 further including a driving gear and a locking gear.

22. A multifunctional locking device as claimed in claim 2 further including a spring to clutch or lock the reel.

23. A multifunctional locking device comprising:
a housing;
a motor in the housing;
an actuator including a distal end, a filament configured to convey a signal between the distal end and the housing, a first actuator section including a first plurality of engagement members, and a second actuator section including a second plurality of engagement members;
a reel in the housing, the reel defining a reel axis, the reel being driven about the reel axis by the motor, the reel being configured to wind up and store the first actuator section, at a time when the first engagement members are disengaged from the second engagement members, such that the first actuator section completely encircles the reel;
a circuit in the housing, the circuit being driven about the reel axis by the motor, the circuit being configured to receive the signal from the filament and transmit the received signal in a wireless manner; and
a combining section, the combining section configured to bring the first actuator section together with the second actuator section, to engage the first plurality of engagement members with the second plurality of engagement members, thereby increasing a rigidity of the actuator and enabling the actuator to impart both a pushing force and a pulling force to an object.

24. A multifunctional locking device as claimed in claim 23 wherein the filament is an optical fiber.

25. A multifunctional locking device as claimed in claim 23 wherein the filament is an electrical conductor.

26. A multifunctional locking device as claimed in claim 23 wherein the filament is in the first actuator section.

27. A multifunctional locking device as claimed in claim 26 further including a second filament the second filament configured to convey a second signal between the distal end and the housing, the second filament being in the second actuator section.

28. A multifunctional locking device as claimed in claim 23 wherein the filament is an optical fiber.

29. A multifunctional locking device as claimed in claim 23 wherein the filament is an electrical conductor.

30. A multifunctional locking device as claimed in claim 23 wherein the filament is in the first actuator section.

31. A multifunctional locking device as claimed in claim 23 further including
a second circuit in the housing,
the first circuit being configured to transmit the received signal in a wireless manner to the second circuit.

32. A multifunctional locking device as claimed in claim 31 wherein the filament is an optical fiber.

33. A multifunctional locking device as claimed in claim 31 wherein the filament is an electrical conductor.

34. A multifunctional locking device as claimed in claim 31 wherein the filament is in the first actuator section.

35. A multifunctional locking device as claimed in claim 31 wherein the reel includes a tooth surface configured to engage the first actuator.

* * * * *